(12) United States Patent
Huang et al.

(10) Patent No.: US 7,368,879 B2
(45) Date of Patent: May 6, 2008

(54) PENDULUM RESONANT CONVERTER AND METHOD

(75) Inventors: Zan Huang, Torrance, CA (US); Thomas J. Ribarich, Laguna Beach, CA (US)

(73) Assignee: International Rectifier Corporation, El Segundo, CA (US)

( * ) Notice: Subject to any disclaimer, the term of this patent is extended or adjusted under 35 U.S.C. 154(b) by 80 days.

(21) Appl. No.: 11/063,524

(22) Filed: Feb. 22, 2005

(65) Prior Publication Data

US 2005/0195626 A1 Sep. 8, 2005

Related U.S. Application Data

(60) Provisional application No. 60/546,362, filed on Feb. 19, 2004.

(51) Int. Cl.
*H05B 37/02* (2006.01)
(52) U.S. Cl. .................. 315/224; 315/291; 315/209 R; 315/276; 315/194; 315/244; 315/219
(58) Field of Classification Search ............ 315/209 R, 315/224, 226, 307, 247, 244; 363/34–37, 363/132
See application file for complete search history.

(56) References Cited

U.S. PATENT DOCUMENTS

| | | | | |
|---|---|---|---|---|
| 4,039,897 A | * | 8/1977 | Dragoset | 315/205 |
| 4,734,624 A | * | 3/1988 | Nagase et al. | 315/243 |
| 5,063,490 A | * | 11/1991 | Maehara et al. | 363/37 |
| 5,166,579 A | * | 11/1992 | Kawabata et al. | 315/209 R |

(Continued)

Primary Examiner—Douglas W. Owens
Assistant Examiner—Chuc Tran
(74) Attorney, Agent, or Firm—Ostrolenk, Faber, Gerb & Soffen, LLP

(57) ABSTRACT

A resonant switching converter comprising a first pair of series connected switches comprising a high side switch and a low side switch coupled across a DC input voltage, there being a first switched node between the switches; a second pair of series connected switches comprising a high side switch and a low side switch coupled across a DC bus, there being a second switched node between the switches; a DC bus capacitor coupled across the DC bus; the first and second switched nodes adapted to have a load coupled therebetween; the high side switch of the first pair of switches supplying current to the load from the DC input voltage, the low side switch of the first pair of switches being switched opposite the high side switch of the first pair of switches and providing a re-circulation path to allow bi-directional current flow through the load; the high side switch of the second pair of switches supplying current to the load from the DC bus capacitor, the low side switch of the second pair of switches being switched opposite said high side switch of the second pair of switches and providing a re-circulation path to allow bi-directional current flow through the load; a controller for controlling the switching of each of the switches of the first and second pairs of switches, the controller comprising a phase shift circuit providing a phase shift between the control signals driving the switches of the first and second pairs of switches to shape the waveshape of the output voltage of the converter provided to the load; the controller further comprising a first circuit for providing a first compensation signal for the control signals driving the first pair of switches to compensate for variation of the DC input voltage; and a second circuit for providing a second compensation signal for the control signals driving the second pair of switches to compensate for variation of the DC bus voltage.

33 Claims, 22 Drawing Sheets

U.S. PATENT DOCUMENTS

| | | | | |
|---|---|---|---|---|
| 5,365,150 A * | 11/1994 | Shiomi et al. | ........... | 315/209 R |
| 5,410,221 A * | 4/1995 | Mattas et al. | ................ | 315/307 |
| 5,539,281 A * | 7/1996 | Shackle et al. | ............. | 315/224 |
| 5,565,743 A * | 10/1996 | Yamashita et al. | ........... | 315/310 |
| 5,671,128 A * | 9/1997 | Nakamura et al. | ............. | 363/16 |
| 5,781,419 A * | 7/1998 | Kutkut et al. | ................. | 363/17 |
| 5,883,473 A * | 3/1999 | Li et al. | ..................... | 315/225 |
| 5,914,572 A * | 6/1999 | Qian et al. | .................. | 315/307 |
| 6,118,228 A * | 9/2000 | Pal | ............................. | 315/307 |
| 6,137,233 A * | 10/2000 | Moisin | ................... | 315/209 R |
| 6,188,183 B1 * | 2/2001 | Greenwood et al. | ........ | 315/307 |
| 6,323,603 B1 * | 11/2001 | Persson | ...................... | 315/290 |
| 6,380,694 B1 * | 4/2002 | Uchihashi et al. | .......... | 315/244 |
| 6,388,226 B1 * | 5/2002 | Smith et al. | ........... | 219/121.57 |
| 6,426,597 B2 * | 7/2002 | Rast et al. | .................. | 315/219 |
| 6,437,515 B1 * | 8/2002 | Kamoi et al. | ........... | 315/209 R |
| 6,633,138 B2 * | 10/2003 | Shannon et al. | ............ | 315/224 |
| 6,784,622 B2 * | 8/2004 | Newman et al. | ............ | 315/219 |
| 6,864,645 B2 * | 3/2005 | Sun et al. | .................... | 315/308 |
| 6,919,694 B2 * | 7/2005 | Moyer et al. | ................ | 315/224 |
| 7,081,709 B2 * | 7/2006 | Pak | ............................ | 315/101 |
| 7,084,584 B2 * | 8/2006 | Ben-Yaakov | ................ | 315/291 |
| 2001/0020830 A1 * | 9/2001 | Rast et al. | ................... | 315/172 |
| 2002/0011806 A1 * | 1/2002 | Moisin | ....................... | 315/291 |
| 2002/0191429 A1 * | 12/2002 | Nadd et al. | .................. | 363/132 |
| 2004/0032223 A1 * | 2/2004 | Henry | ....................... | 315/291 |
| 2004/0183463 A1 * | 9/2004 | Sun et al. | .................... | 315/224 |
| 2004/0183472 A1 * | 9/2004 | Kamoi et al. | ............... | 315/291 |
| 2004/0183473 A1 * | 9/2004 | Kamoi et al. | ............... | 315/291 |
| 2005/0035729 A1 * | 2/2005 | Lev et al. | .................... | 315/291 |
| 2005/0110431 A1 * | 5/2005 | Ben-Yaakov | ................ | 315/291 |

\* cited by examiner

PENDULUM RESONANT CONVERTER AND METHOD

CROSS-REFERENCE TO RELATED APPLICATION

This application claims the benefit and priority of U.S. Provisional patent application Ser. No. 60/546,362 filed Feb. 19, 2004 entitled SWITCHING CONTROL METHOD AND SYSTEM FOR SINGLE STAGE RESONANT POWER CONVERTER, the entire disclosure of which is incorporated herein by reference.

BACKGROUND OF THE INVENTION

The present invention relates to power supply converter circuits, and in particular to converter circuits known as resonant converters, and more particularly to such converters for powering gas discharge lamps, e.g., fluorescent lamps.

Typical existing converter solutions include a power factor correction (PFC) stage for producing a sinusoidal input current and a regulated DC bus voltage, followed by a resonant mode output stage necessary for converting the DC bus voltage to the desired output voltage level. See FIG. 1.

The PFC stage is typically realized with a boost-type converter and requires a high voltage switch, an inductor, a diode, a high voltage DC bus capacitor, and a PFC control circuit. The resonant mode output stage is typically realized with a half-bridge driven resonant load and requires two high voltage switches, a resonant inductor, a resonant capacitor, a DC-blocking capacitor and a ballast control circuit.

In a traditional half-bridge ballast output stage configuration, as shown in FIG. 2, the top switch of the half-bridge, M1, and the top of the DC bus capacitor, Cbus, are connected together at a single node. The power factor controller, comprised of Lpfc, Mpfc, Dpfc and a PFC control chip (not shown), must first charge Cbus and then Cbus supplies the half-bridge resonant converter the entire time.

SUMMARY OF THE INVENTION

The present invention, called a pendulum resonant converter, combines the above functions into a single-stage, as shown in FIG. 3, and requires only a single resonant inductor, a resonant capacitor, four lower voltage switches, a lower voltage DC bus capacitor, and a single control circuit, as shown in FIG. 4. The gates of the switches M1, M2, M3 and M4 are then controlled as described herein to achieve high power factor and drive the lamp load.

In this configuration, as shown in FIG. 4, the DC bus capacitor, Cbus, is placed on the one side of a second half-bridge (M3 and M4). The DC bus capacitor is separated from the input voltage by the first half-bridge (M1 and M2), the resonant output stage (L, C, and Lamp), and the second half-bridge (M3 and M4), and the DC blocking capacitor CDC.

By connecting the circuit in this fashion, bi-directional power flow through the load is achieved. Power is supplied from the rectified line input, for example, when the rectified line input voltage is high, and then supplied from the capacitor Cbus when the rectified line input voltage is low. The capacitor, Cbus, must now only supply power for a portion of the input line voltage cycle. With proper control of the switches (M1, M2, M3, and M4), sinusoidal current is drawn from the line with high power factor, the DC bus capacitor, Cbus, is charged, and a constant power in the load, Rload, is maintained. This is achieved by a phase control of the switches such that there is a phase shift between the times when switches M1 and M3 are turned on. Switches M2 and M4 are controlled complementarily to respective switches M1 and M3, that is, when switch M1 goes on, M2 goes off, when M1 goes off, M2 goes on and likewise, when M3 goes on, M4 goes off and when M3 goes off, M4 goes on. Accordingly, there is a phase shift between M1 and M3, and the same phase shift between M2 and M4. This allows the lamp to be powered with a bi-directional flow and the capacitor Cbus to be charged and discharged.

The line side first half-bridge comprises switches M1 and M2, and the second DC bus side half-bridge comprises switches M3 and M4. The resonant output stage comprises inductor L, capacitor C and the Lamp, and the DC bus capacitor is labeled as CBUS. A simple overview of how the topology works is achieved by describing the function of each switch. Switch M1 is used for supplying current to the load from the rectified line, and, is switched on and off in such a way that a sinusoidal current is drawn from the line for achieving high power factor. Switch M2 is switched on and off oppositely from switch M1 and serves as a re-circulation path to maintain bi-directional current flow in the circuit. Switch M3 is used for supplying current to the load from the DC bus capacitor for maintaining a constant power. Switch M4 is switched oppositely to switch M3 and serves as a re-circulation path to maintain bi-directional current flow in the circuit, and, together with the body diode of M3, is used to control the charging of capacitor CBUS. In order to achieve a high power factor, the control signals for driving the gates of switches M1, M2, M3 and M4 are pulse width modulated, to compensate for the effects of changing DC input and DC bus voltage levels.

According to one aspect, the invention comprises a resonant switching converter comprising: a first pair of series connected switches comprising a high side switch and a low side switch coupled across a DC input voltage, there being a first switched node between the switches; a second pair of series connected switches comprising a high side switch and a low side switch coupled across a DC bus, there being a second switched node between the switches; a DC bus capacitor coupled across the DC bus; a load adapted to be coupled between the first and second switched nodes adapted to have a load coupled therebetween; the high side switch of said first pair of switches supplying current to the load from said DC input voltage, the low side switch of said first pair of switches being switched opposite said high side switch of said first pair of switches and providing a re-circulation path to allow bi-directional current flow through the load; the high side switch of said second pair of switches supplying current to the load from said DC bus capacitor, the low side switch of said second pair of switches being switched opposite said high side switch of said second pair of switches and providing a re-circulation path to allow bi-directional current flow through the load; a controller for controlling the switching of each of said switches of said first and second pairs of switches, said controller comprising a phase shift circuit providing a phase shift between control signals driving the switches of the first and second pairs of switches to shape the waveshape of the output voltage of the converter provided to the load; the controller further comprising a first circuit for providing a first compensation signal for the control signals driving the first pair of switches to compensate for variation of the DC input voltage; and a second circuit for providing a second compensation signal for the control signals driving the second pair of switches to compensate for variation of the DC bus voltage.

A method for operating the converter is also described.

Further, the invention also relates to a circuit and method for determining the lamp load current for the phase shift control.

Other objects, features and advantages of the invention will become apparent in the following detailed description.

BRIEF DESCRIPTION OF THE DRAWINGS

The invention will now be described in greater detail in the following detailed description with reference to the drawings, in which.

DETAILED DESCRIPTION

Figure 1:
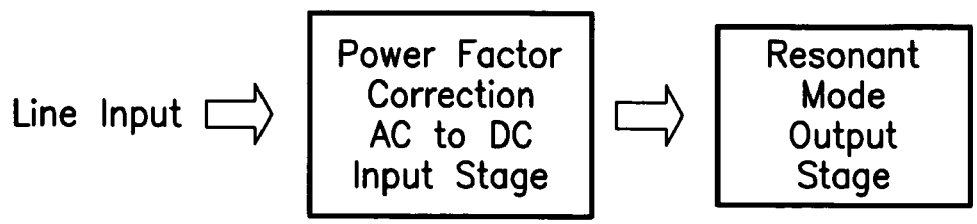
FIG. 1 is a block diagram of a prior art converter circuit.
Figure 2:
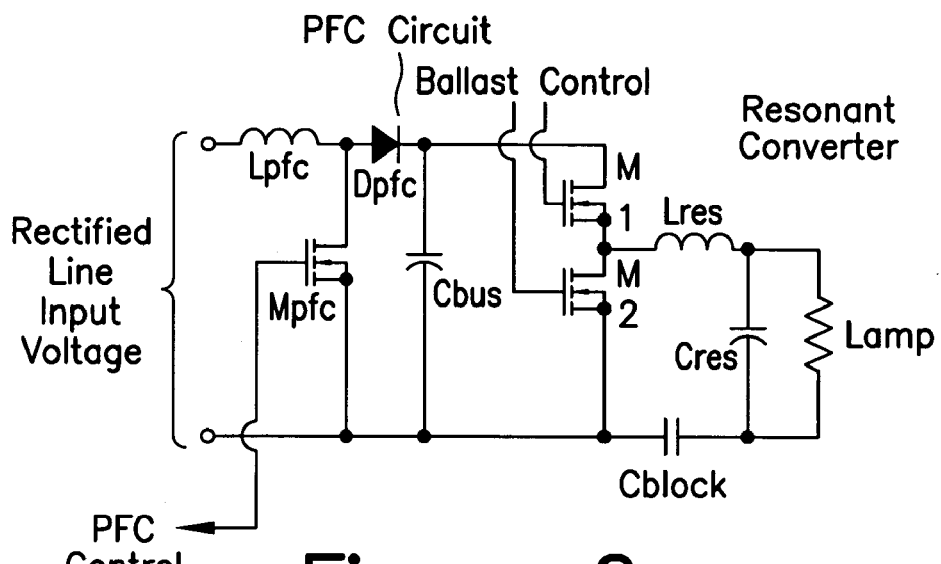
FIG. 2 is a schematic diagram of the prior art converter circuit of FIG. 1.
Figure 3:
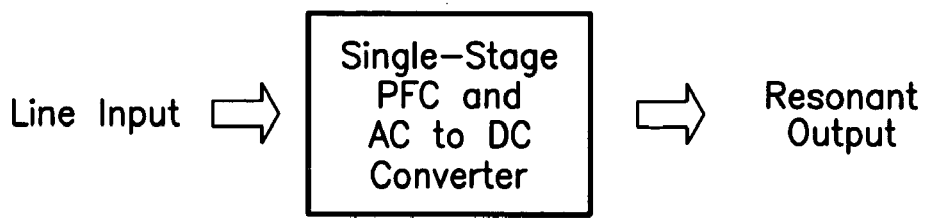
FIG. 3 is a block diagram of a pendulum resonant converter.
Figure 4:
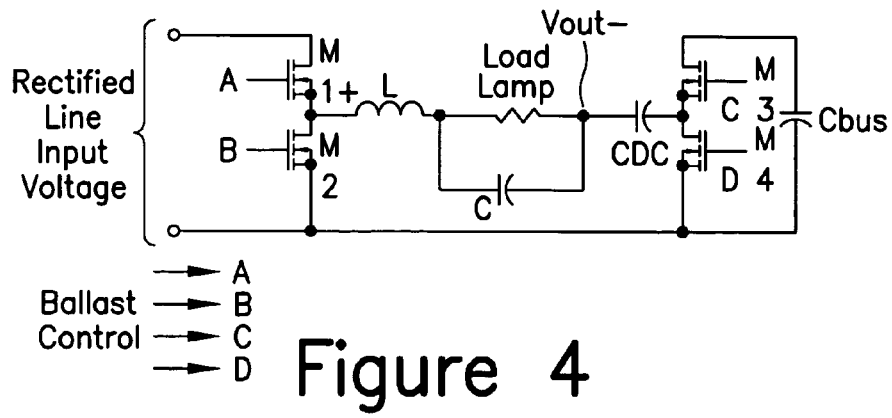
FIG. 4 is a schematic diagram of the converter of FIG. 3.
Figure 5:
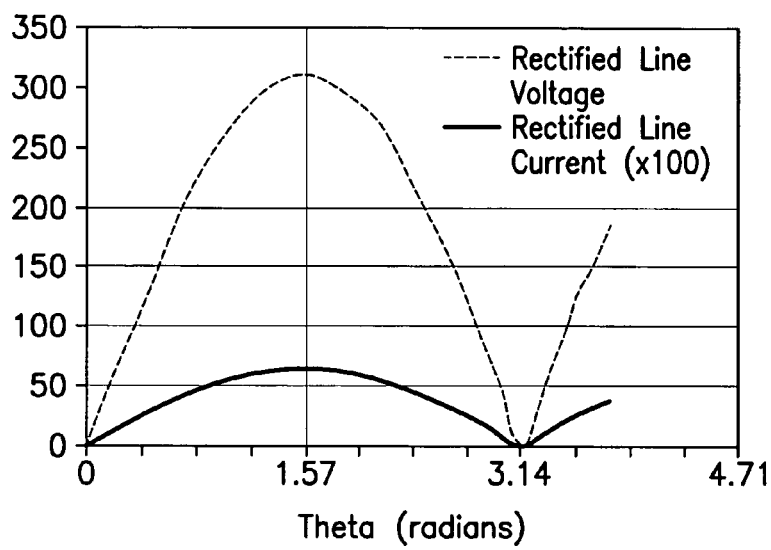
FIG. 5 shows the input rectified line voltage and current for the circuit of FIG. 4.

A more detailed and complete description of the invention is achieved with basic mathematical equations and timing diagrams. For high power factor, the input line voltage and current are both sinusoidal and in phase. This causes the circuit to appear resistive to the line input voltage. Starting at the output of a full-bridge rectifier converting the AC input voltage to the DC input voltage, the voltage and current are both full-wave rectified and in phase, as shown in FIG. 5.

The corresponding input power is obtained by multiplying the input voltage and current together and is given as:

$$P_{input}=P_{load}(1-\cos 2\theta) \quad (1.1)$$

For a constant power load, the power supplied by the capacitor Cbus is obtained by subtracting the load power from the input power and is given as:

$$P_{capacitor}=P_{load}-P_{input} \quad (1.2)$$

$$P_{capacitor}=P_{load}-P_{load}(1-\cos 2\theta)=P_{load}\cos 2\theta \quad (1.3)$$

Figure 6:
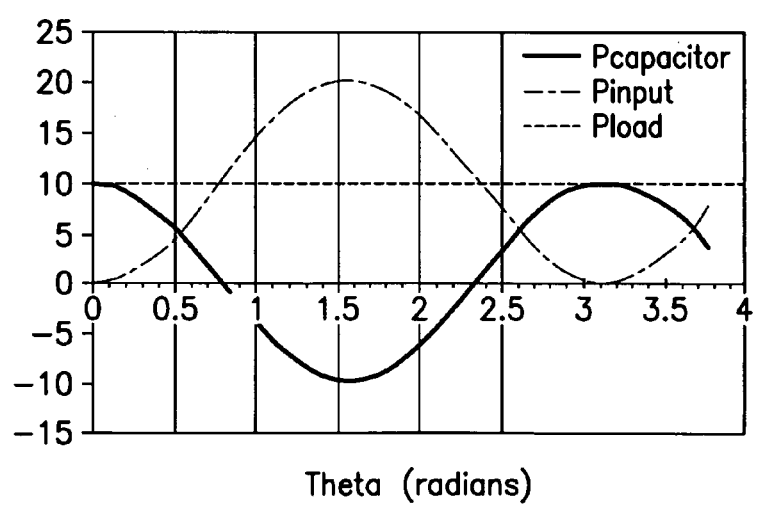
FIG. 6 graphically shows the input power, load power and bus capacitor power for the circuit of FIG. 4.

The graphical representation of the input power, load power and capacitor power shown in FIG. 6 serves as an illustration of how the powers change dynamically over a complete cycle of the line voltage. As shown, the load power is constant. When the input power to the load decreases, the deficit in power is supplied by the DC bus capacitor and vice versa.

Figure 7:
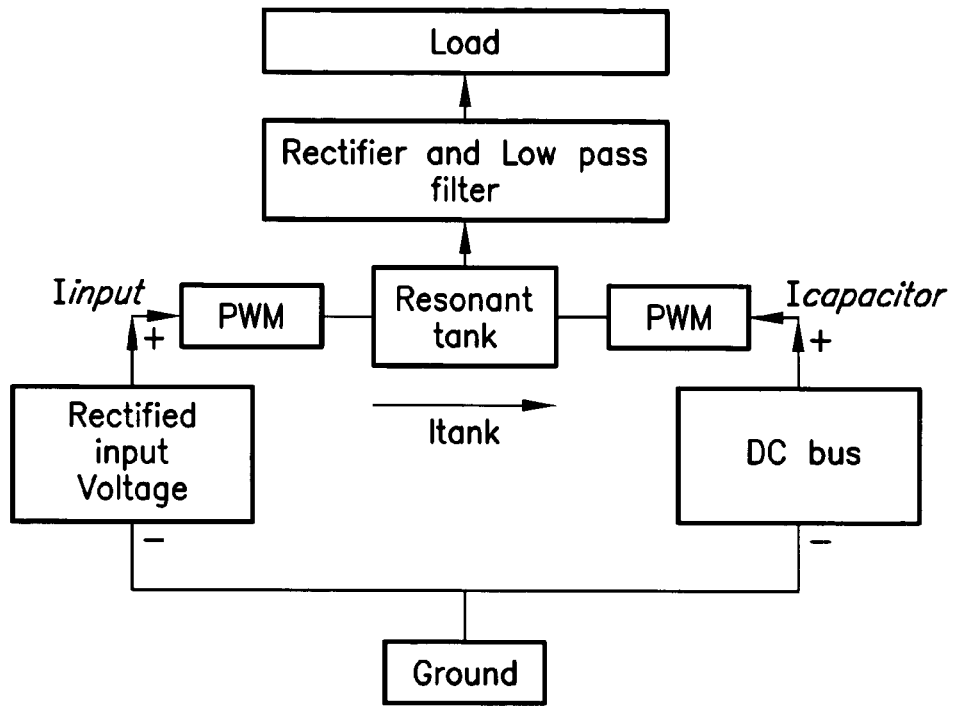
FIG. 7 is a flow diagram showing the power flows amongst the line input, load and bus capacitor for the circuit of FIG. 4.

Based on equation (1.2) and the graph of FIG. 6, the diagram as shown in FIG. 7 can be drawn showing how power flows amongst input, load and bus capacitor.

According to the current direction in this case, the equation follows:

$$C\frac{dVc}{dt}=-Ic \quad (1.4)$$

$(Vc = Vcapacitor, Ic = Icapacitor)$

And from equation (1.3), it follows that:

$$Ic=\frac{Pc}{Vc}=\frac{P_{load}\cos 2\theta}{Vc} \quad (1.5)$$

$(Pc = Pcapacitor, \theta = \omega t)$

Combining equation (1.4) and (1.5), the capacitor Cbus voltage is then determined as a function of the load power as:

$$Vc = \sqrt{Vc_{avg}^2 - \frac{P_{load}}{\omega c}\sin 2\theta} \qquad (1.6)$$

Figure 8:
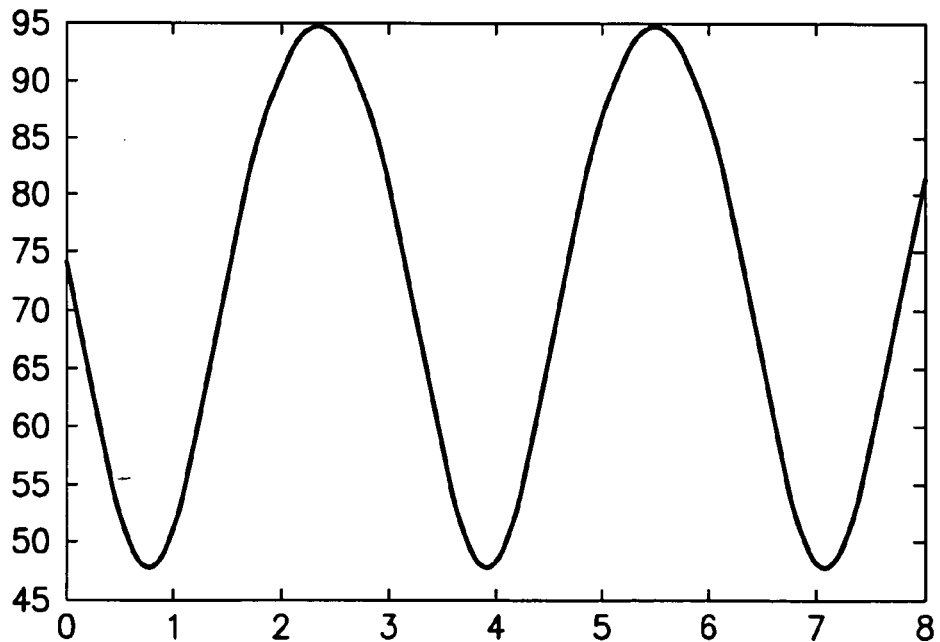
FIG. 8 shows the bus capacitor voltage of the circuit of FIG. 4.
Figure 9:
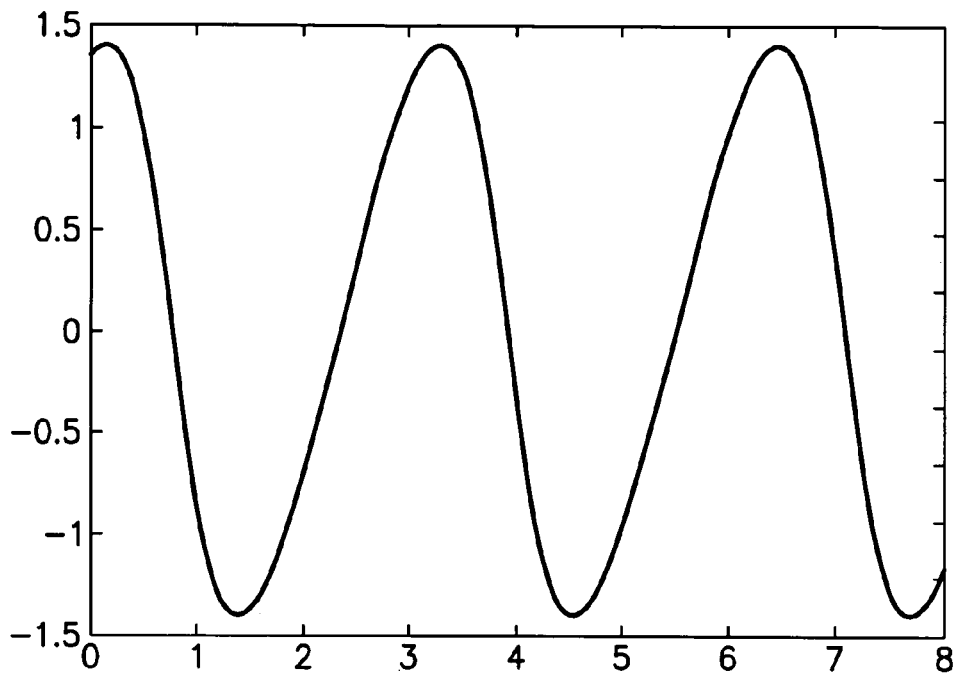
FIG. 9 shows the bus capacitor current of the circuit of FIG. 4.

Graphs of the bus capacitor voltage and current are shown in FIGS. 8 and 9.

Although when the swing is not too large, Vc seems to be sinusoidal, it is actually not. This equation also provides a reference for calculating the DC bus value according to its voltage rating.

Table 1.1 compares the pendulum resonant converter with the conventional 2 stage ballast solution:

TABLE 1.1

Comparison of Pendulum Converter with Conventional Ballast Solution

| | Pendulum Converter | Conventional 2 stages Converter |
|---|---|---|
| Inductor Number | Save the inductor for PFC stage | One for PFC stage and one for resonant tank |
| DC Bus Capacitor Value | Smaller, being able to use film capacitor | Larger value, can use electrolytic capacitors only |
| DC Bus Capacitor Voltage | Lower | 600 V |
| Switches Voltage | Lower | 600 V |
| In Rush Current Limit | Yes | No |
| Power Flow Control | Bi-directional | Single direction |
| Component Count | Reduced | Inductor, high voltage diode, two separated control chips, etc. |
| Converter Size and Cost | Smaller size and lower cost for savings from inductor, DC bus capacitor and the switches | Conventional |
| Circuit Topology | New | Conventional |
| Control Method | New | Conventional |
| Manufacturability and Reliability | Higher | Conventional |
| Efficiency | High | |
| Power Factor | High | |
| Total Harmonic Distortion (THD) | Low | |

Figure 10:
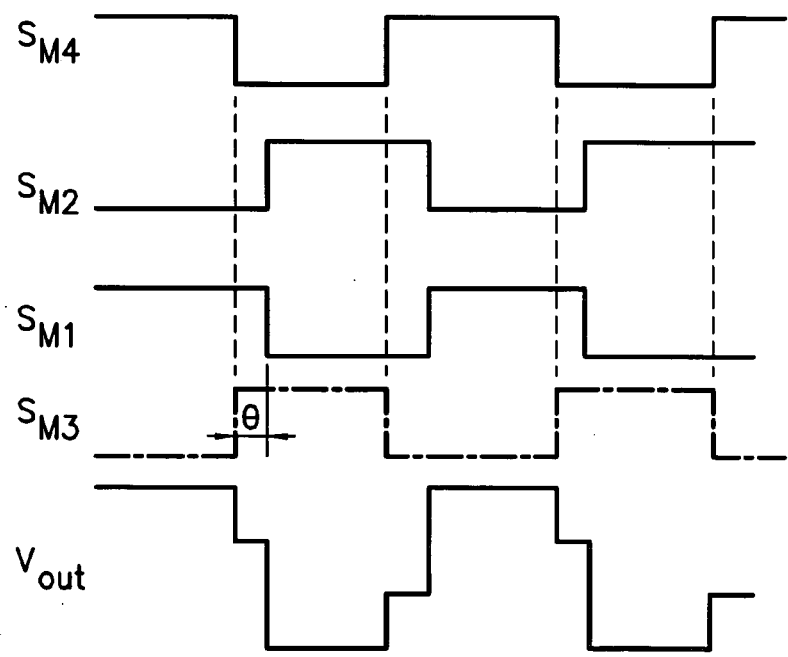
FIG. 10 shows waveforms of the switches M1 to M4 and the output voltage of the circuit of FIG. 4.

A known pendulum resonant converter is designed with a phase shift control to operate switches on the two opposite half-bridges with a phase shift. As shown in FIG. 10, M1 and M3 operate with a phase shift θ (as do M2 and M4) and $V_{out}$ is the voltage applied to the resonant tank. Switches M1 and M2 operate in complementary fashion, that is 180° out of phase, and switches M3 and M4 are switched likewise. However, a phase shift θ is provided between M1 and M3 (and M2 and M4) to generate an output voltage like that shown in FIG. 10.

Figure 11:
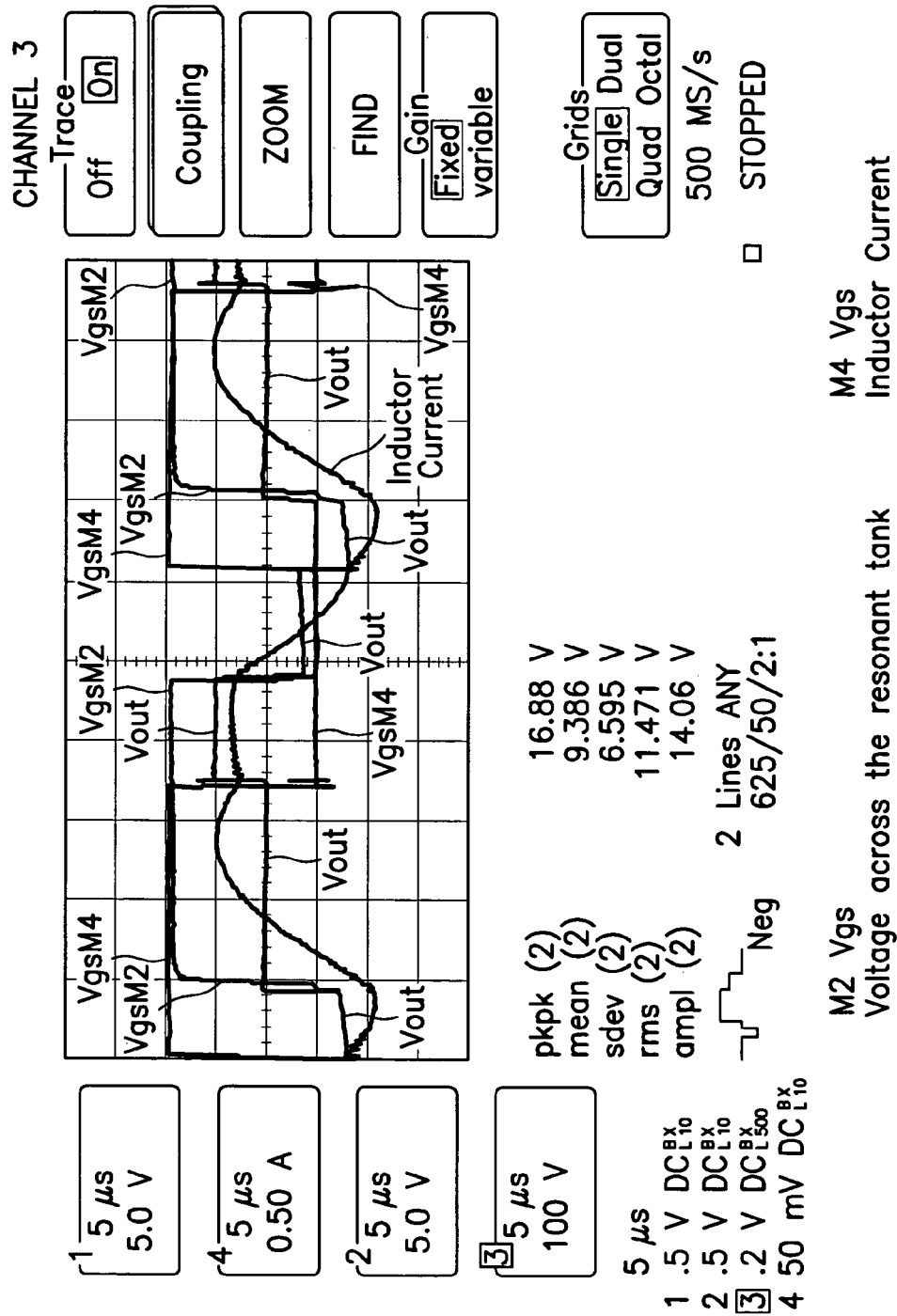
FIG. 11 shows waveforms of the control voltages for the switches M2 and M4 and the inductor current and output voltage for the circuit of FIG. 4.

Waveforms from the circuit are shown in FIG. 11 and these indicate how the phase shift method works.

By employing phase shift control, the voltage $V_{out}$ applied to the resonant tank will have the step waveform as shown in FIG. 10 instead of the square waveform, which is normally seen in the half bridge resonant converter. By changing the amount of phase shift θ, $V_{out}$ is changed accordingly, not only in amplitude but in shape as well. Further, the voltage in the resonant tank, as the fundamental component of $V_{out}$, will also change. In the known pendulum converter employing phase control, the DC bus voltage is considered to be constant, because it is assumed that the DC bus value is large enough. By fixing the pulse width of each switch to be 50% of the switching period, the steady states of the resonant converter can then be calculated.

Figure 12:
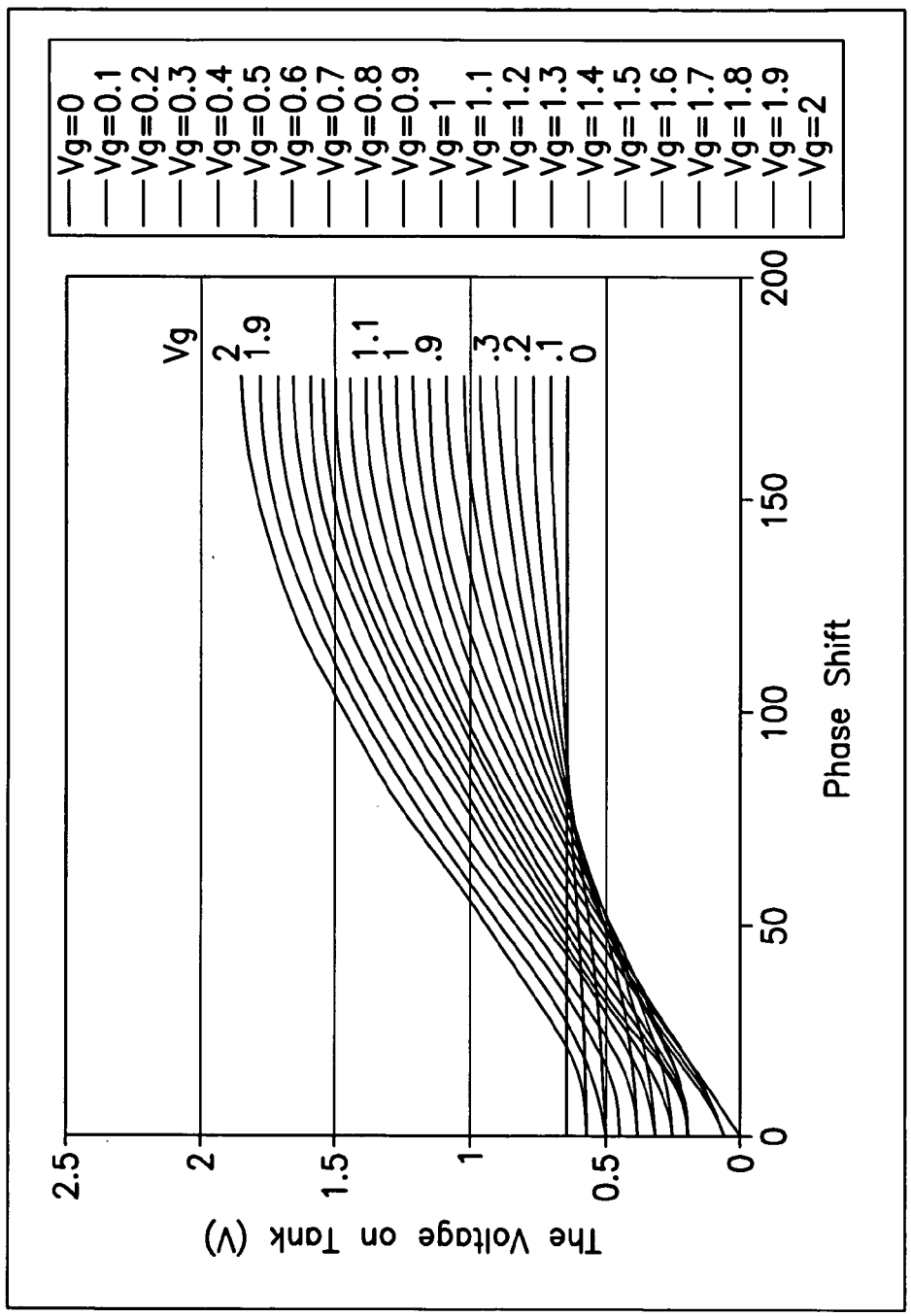
FIG. 12 shows the relationship between the output voltage and phase shift for varying input voltages.

Assuming the DC bus voltage is one unit, the input voltage changes from 0 to 2, and switches M1 and M3 operate with phase shift from 0 to 180 degrees, which means that according to the turning on of M1, M3 will be turned on from exactly the same time to half a switching period delayed from the turn on of M1. Based on a simulation done using Matlab, a graph of the voltage in the resonant tank vs. phase shift and input voltage is shown in FIG. 11 according to the data acquired from the simulation. By choosing the voltage across the resonant tank to be constantly 0.6366, FIG. 12 shows that the relationship between input voltage and the phase shift satisfies a cosine function:

$$\theta = \arccos\left(\frac{V_g}{2}\right) \qquad (2.1)$$

Figure 13:
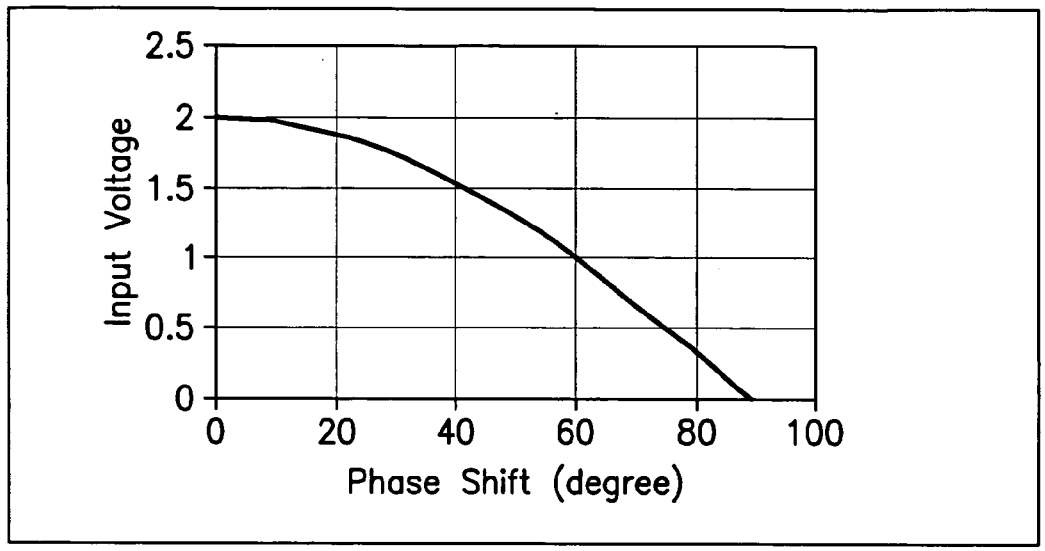
FIG. 13 shows the relationship between input voltage and phase shift for a defined output voltage.

Equation (2.1) gives the relationship between the phase shift and input voltage, for example, when the input voltage is 1, by applying equation (2.1) with $V_{OUT}$=0.6366, the phase shift will be calculated as 60 degrees, which means when M3 operates with a time difference of ⅙ of the switching period (60°) according to M1, the voltage in the resonant tank will be 0.6366, which can be maintained constantly by applying equation (2.1) for the whole line period. This is shown in FIGS. 12 and 13.

Figure 14:
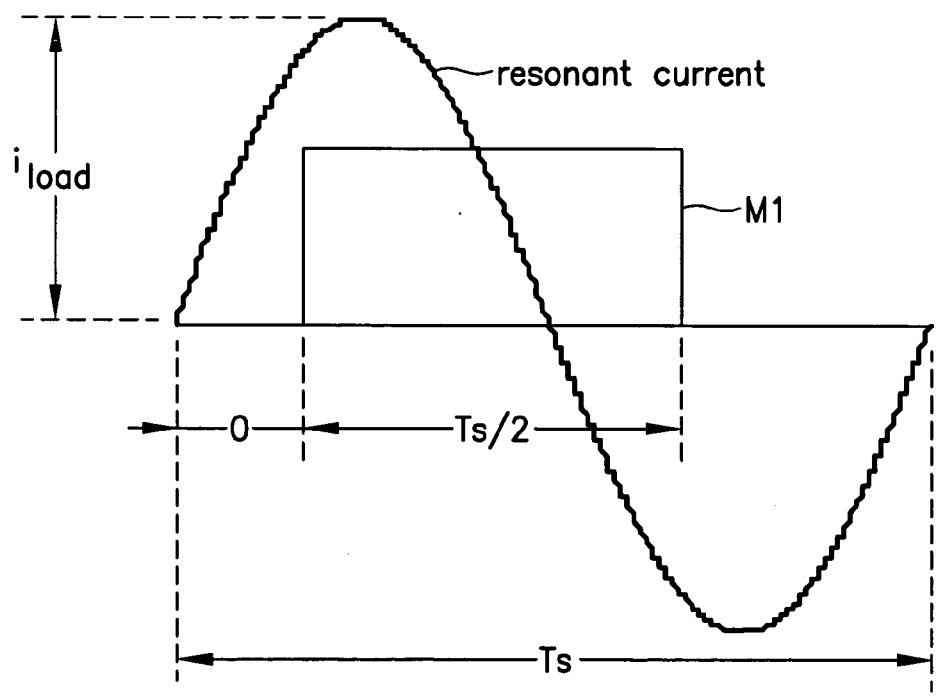
FIG. 14 shows the phase shift between switch M1 and the resonant current.

Also, the phase shift between the turning on edge of M1 and the fundamental component of the voltage across the resonant tank equals the phase shift θ between M1 and M3 as shown in FIG. 14.

Assuming the power factor of the resonant tank is one unit, the equation of input current $i_g$ can be derived as follows:

$$\langle i_g \rangle = \frac{1}{T_s} \int_0^{\frac{T_s}{2}} i_{Load} \cdot \sin(\omega \cdot t + \theta) \cdot dt \quad (2.2)$$

$$= \frac{1}{T_s} \int_0^{\frac{T_s}{2}} i_{Load} \cdot \sin\left(2 \cdot \pi \cdot \frac{t}{T_s} + \theta\right) \cdot dt$$

$$= 2 \cdot i_{load} \cdot \frac{1}{\pi} \cdot \cos\theta$$

From equations (2.1) and (2.2), it can be seen that if the DC bus voltage equals half the peak input voltage, when the described phase shift technique is used to keep a constant output voltage, the input current will be sinusoidal and in the same phase with the input voltage, which realizes a single stage power factor controller.

Figure 16:
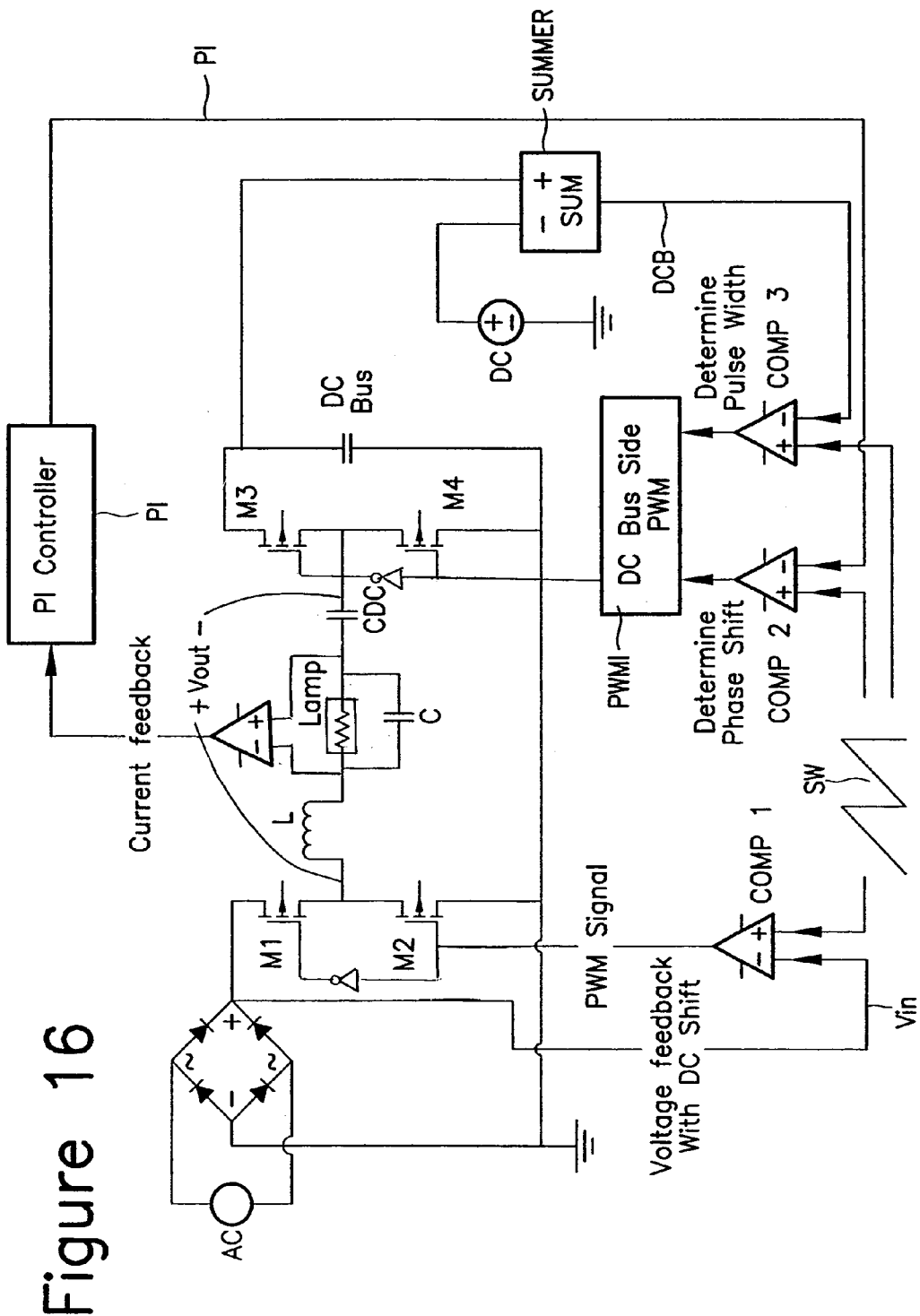
FIG. 16 shows a schematic diagram of the circuit of the invention.

However, in any practical implementation using a real capacitor in the circuit, the DC bus voltage will not be constant and actually will have to swing according to equation (1.6). According to the invention, a PWM control is employed to compensate for the swing to provide improved regulation of lamp current and improve the power factor and THD. Also, the DC input voltage will vary. Several different PWM compensations can be combined to provide compensation for these variations. In one implementation, the rectified input voltage is sensed and is fed back to control the line side switches. This is shown in FIG. 16 and will be described in more detail below. The concept is to have a smaller pulse width for M1, when the input voltage is low or the input current is supposed to be low; and to have a larger pulse width for M1 when the input voltage is high or the input current is supposed to be high. Similarly, the DC bus side switches are also controlled to compensate for the DC bus voltage swing.

Figure 15:
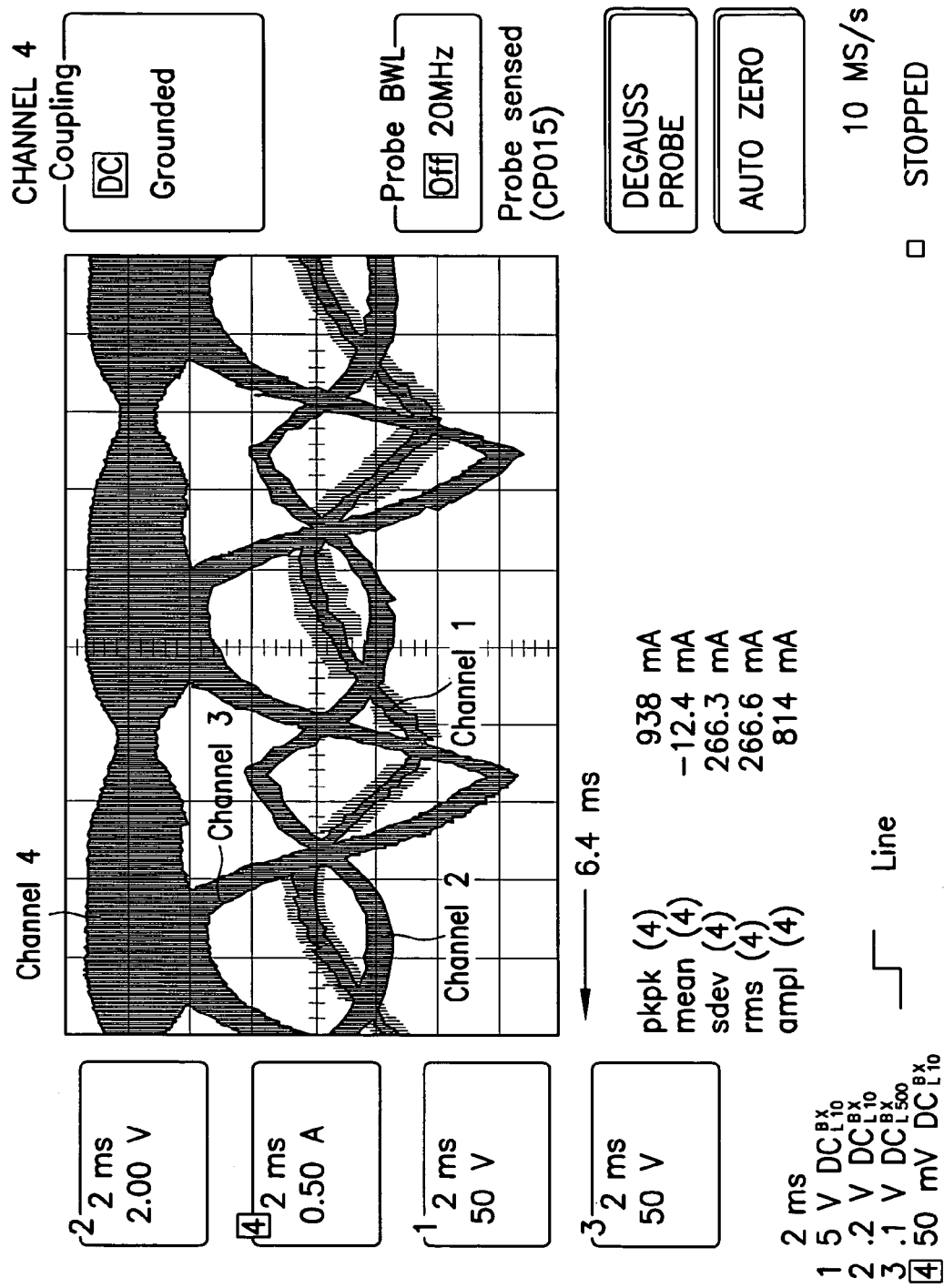
FIG. 15 shows graphs of waveforms of the circuit according to the invention shown in FIG. 16 utilizing PWM compensation of the drive signals to the half-bridge switches.

In the graph of FIG. 15, channel 1 shows the DC bus voltage as a noisy triangular waveform. It swings from approximately 100V to 200V.

Channel 2, which is a flipped rectified sinusoidal waveform with shift level, is the line side PWM compensation signal applied to the line side switches. In actuality, as would be apparent to one of skill in the art based on this disclosure, two complementary signals are generated from the PWM compensation signal, each 180° out of phase with the other and applied respectively to the two line sides M1 and M2. This PWM sawtooth waveform has, in the example, a 15V peak and swings from 6V to 8V, which corresponds to about 50% pulse width.

Channel 3, which is a rectified sinusoidal waveform, shows the voltage on the input capacitor, which has a peak voltage at about 300V and rms about 215V. This voltage can not go all the way down to zero when driving a lamp.

Channel 4 shows the lamp current, which is regulated most of the period but can not maintain its amplitude all the time.

The PWM compensation signal which is shown on channel 2 is also beneficial for THD and PFC, as it forces the current to change according to the input voltage.

FIG. 16 is a simplified schematic diagram of the circuit implementing the PWM compensation signals and from which the waveforms of FIG. 15 are taken. An inductor L, a capacitor C and a lamp comprise the resonant tank and across which $V_{out}$ is measured. A current signal is sensed from the resonant tank and filtered and supplied to the PI controller PI acting as a feedback path for the phase shift, previously described with reference to FIGS. 10-14. A circuit for sensing the lamp current will be described with reference to FIG. 20.

A sawtooth waveform SW with frequency illustratively at around 37 KHz is generated by a suitable oscillator. The sawtooth SW is compared in a first comparator COMP 1 with the signal $V_{IN}$ from the line side voltage. This generates complementary PWM compensation signals for the line side switches M1 and M2. The falling edge of M1, and thus the rising edge of M2, will be fixed according to the falling edge of the sawtooth waveform. As known to those of skill in the art, suitable dead time is maintained between the on times of the half-bridge switches to prevent cross conduction.

The feedback signal from the PI controller PI is compared to the saw-tooth waveform via comparator COMP2. This determines the previously discussed phase shift between the DC bus side switches and line side switches.

According to the invention, a third comparator COMP3 compares the DC bus voltage, summed with a DC voltage DC (via the summer) and the sawtooth (SW). While the phase shift is determined by the falling edge, the DC bus voltage thus determines the pulse width of the DC bus side switches M3 and M4.

Figure 17:
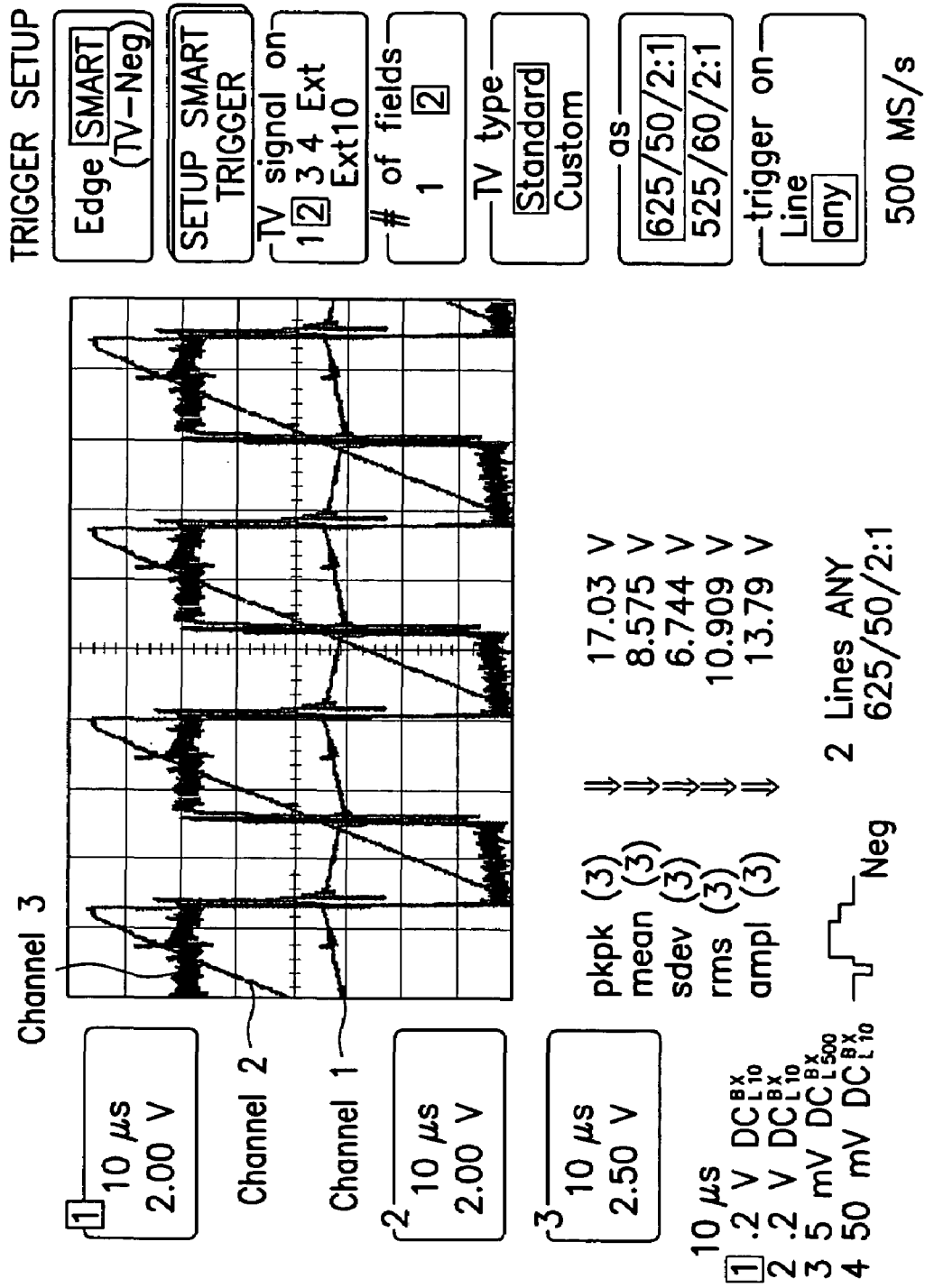
FIG. 17 shows waveforms of the circuit of FIG. 16, showing how the line side signal determines the pulse width of the line side control signals for the line side switches.
Figure 18:
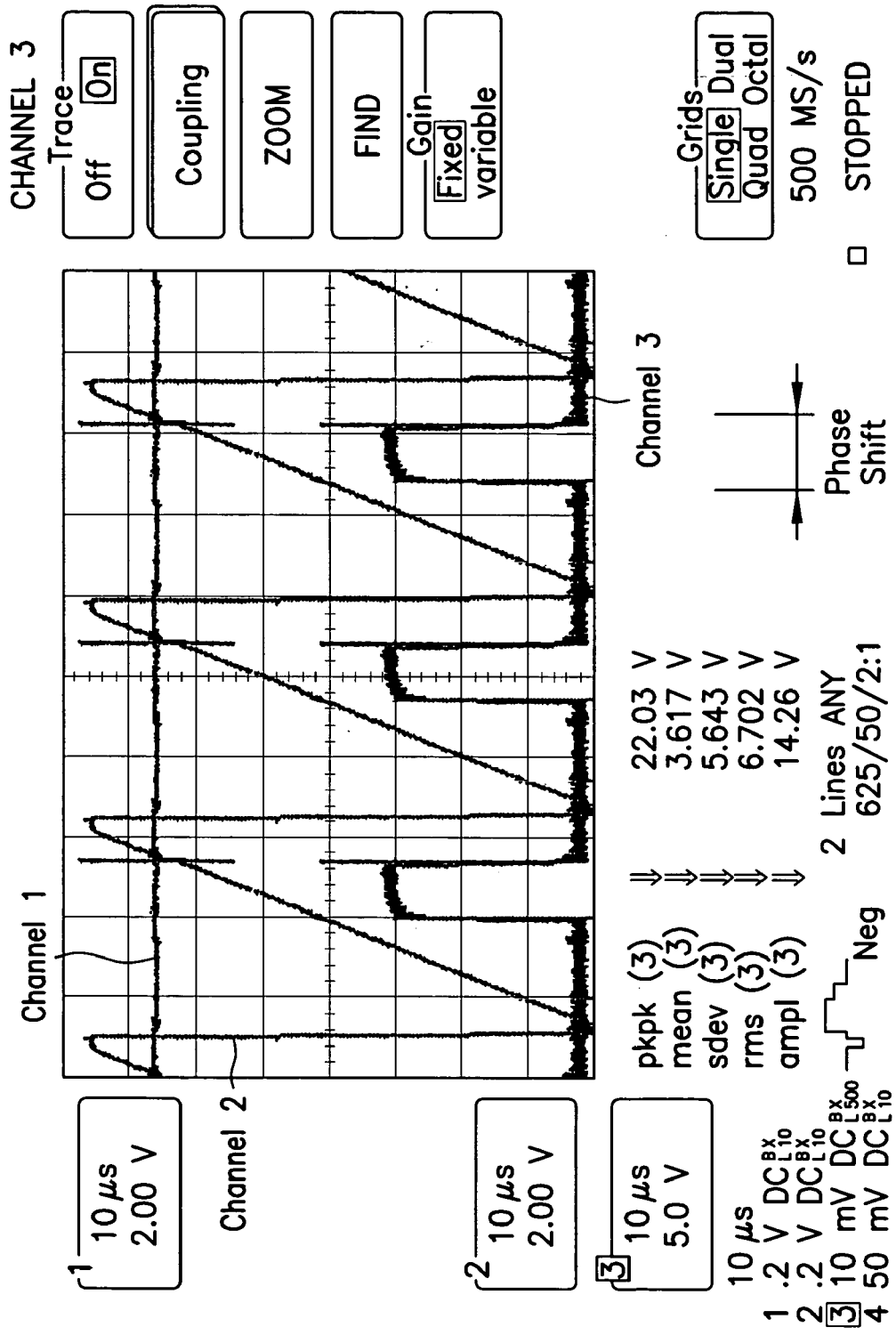
FIG. 18 shows waveforms of the circuit of FIG. 16, showing how the DC bus side signal determines the pulse width with the requisite phase shift of the DC bus side switches.

FIGS. 17 and 18 show how the control method is implemented in the circuit and how the waveforms are generated. FIG. 17 shows how the line side control signals are determined via comparator COMP 1. Channel 1 is the line input voltage $V_{IN}$; channel 2 is the sawtooth SW; and channel 3 is the output of the comparator COMP 1.

As shown, when the sawtooth exceeds the line input voltage, the comparator provides a high output. Depending on the input voltage level, a pulse width modulated control signal is thus generated.

FIG. 18 shows that the Cbus side signal determines the pulse of the DC bus side switches via comparator COMP3. Channel 1 is the input from the summer to COMP3; channel 2 is the sawtooth SW; and channel 3 is the output of comparator COMP3. As shown, the circuit PWM1 superimposes the phase shift on the pulse width modulated signal as shown in FIG. 18 as determined by comparator COMP2. As shown, the pulse width of the output of PWM1 is determined by the time period when the sawtooth SW exceeds the voltage DCB from the output of the summer. The phase shift of the output of PWM1 is determined by COMP2 as previously described. The phase shift of the output of PWM1 is shown by the arrows marked "phase shift" in FIG. 18.

Figure 19:
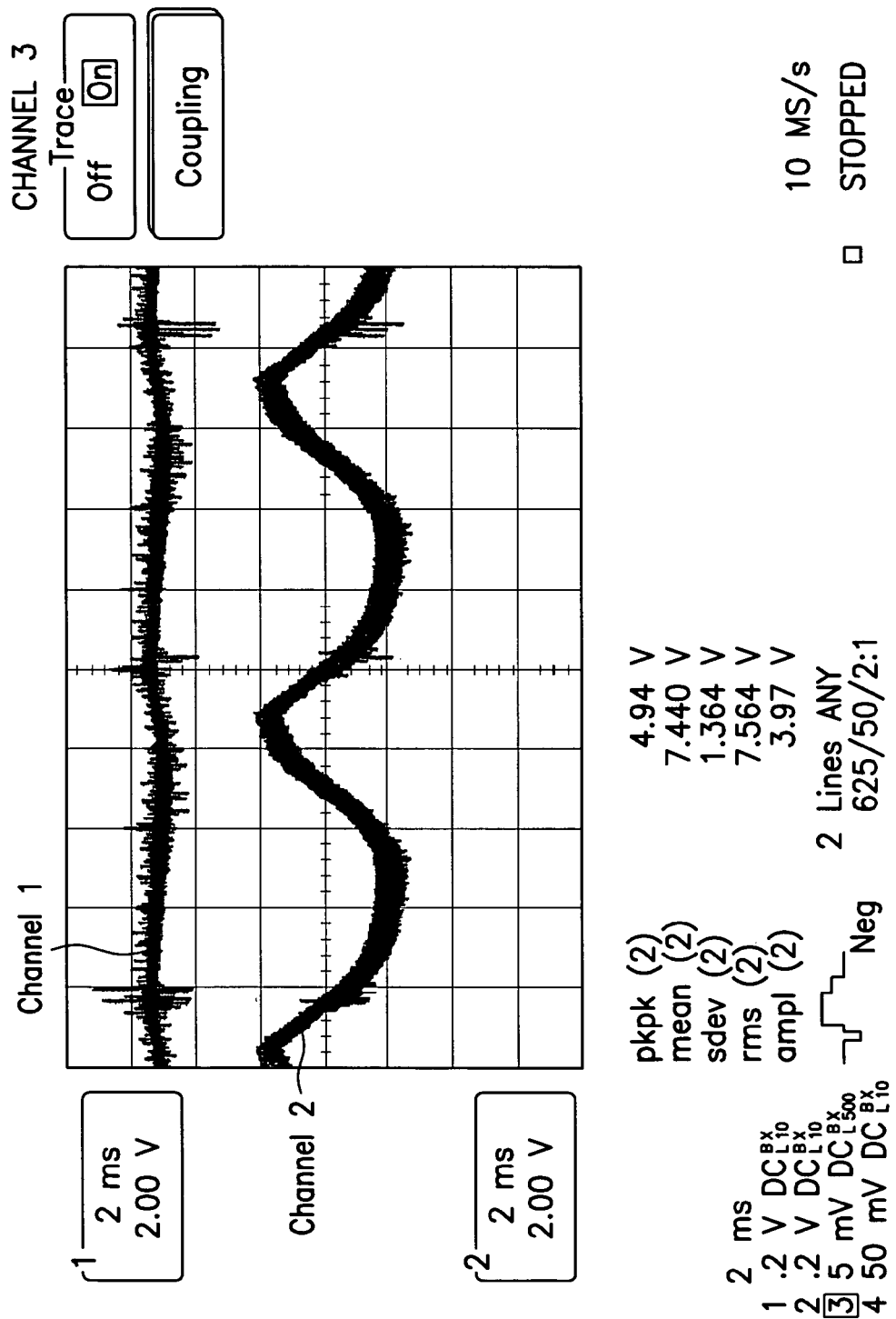
FIG. 19 shows further waveforms of the circuit of FIG. 16.

Turning to FIG. 19, channel 1 is the phase shift signal from circuit PWM 1. According to the 15V peak sawtooth, the signal with about 1V swinging range gives about 25 degrees phase shift. Channel 2 is the line side PWM signal from COMP 1, which changes the pulse width from about 35% to 60%. They both have a frequency the same as the rectified input voltage, which is 120 Hz in this case. Both signals are shown plotted against a low frequency time sweep, so the 120 Hz line frequency is apparent.

In order to provide the phase shift, the lamp current or some other output parameter must be sensed. As the lamp current is the main factor affecting the lumen level it is used. However, there is no direct way to sense the lamp current as it is only within the lamp. Also, because the lamp has a negative resistance behavior, the lamp will try to hold the voltage across it constant even when the lamp current amplitude is changing.

Figure 20:
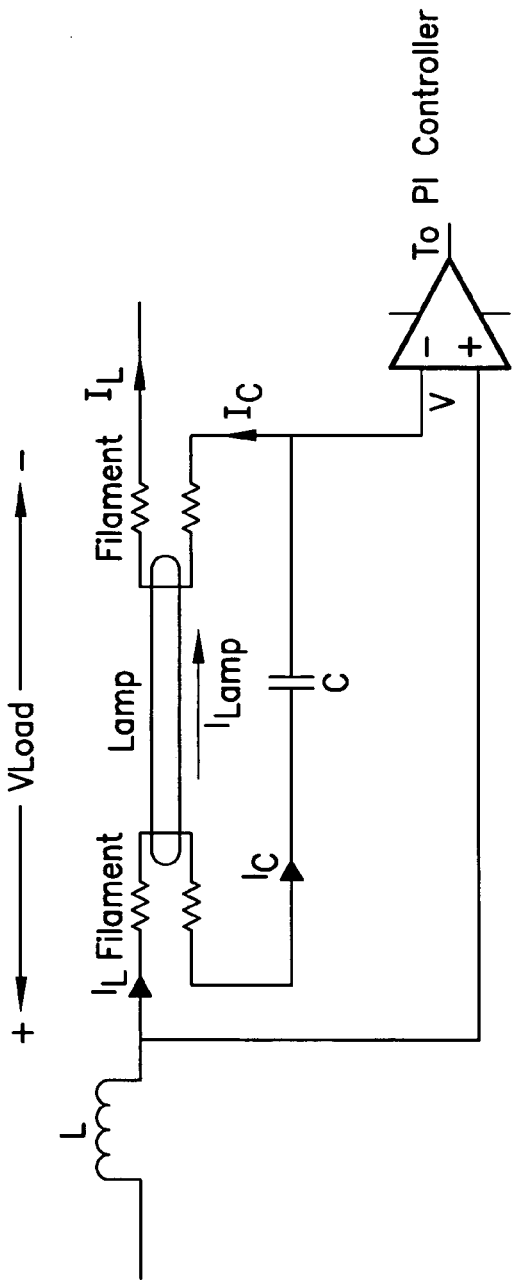
FIG. 20 shows a circuit for determining lamp current for the phase shift control.

FIG. 20 shows a circuit to sense lamp current.

The voltage sensed in the circuit of FIG. 20 can be represented as:

$$V = I_L * R_{filament} + V_{lamp} - I_C * R_{filament} = V_{load} + (I_L - I_C) \\ * R_{filament} = V_{load} + I_{load} * R_{filament}$$

The filament resistances are shown outside the lamp, only for purposes of explanation. They are obviously inside the lamp.

As the lamp will try to keep $V_{load}$ constant, V will reflect the trend of $I_{load}$ and then can be used to be the current sensing feedback. Using an Op Amp, only a half cycle of the signal is sensed assuming the signal has a symmetric waveform. Because the filament resistance is small compared to the load, this approach is not particularly sensitive for sensing the lamp current. However, it is easy, effective and efficient.

Figure 21:
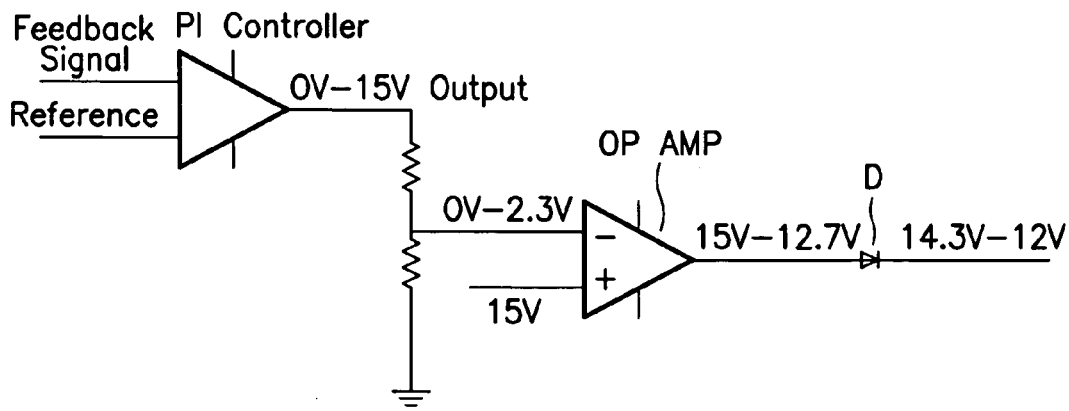
FIG. 21 shows a circuit for the phase shift control of the DC bus side switches of FIG. 16.

The phase shift provided by COMP2 is the main control of the circuit. For controlling the phase shift from 0 to 90 degrees, according to the 15V sawtooth waveform, the signal level is limited within 15V to 11.5V. Considering the practicalities, the actual limit is 14.3V to 12V. A voltage divider, an Op Amp, and a diode D can be used to realize the phase shift control as shown in FIG. 21.

By changing the reference input of the PI controller, the controller's output level changes and it moderately changes the lamp current level. The parameters of the PI controller do not need to be very accurate as long as it is fast enough.

Theoretically, the PWM signal from the output of COMP1 of FIG. 16 should have a valley of 50% pulse width, as it supplies the highest possible current for the peak of the line current. However, as the phase shift cannot go accurately to 0 degrees, this purpose can not be realized together with satisfying other regulations, and actually it swings from 35% to 60%. A circuit for generating the PWM control signal for the line switches M1 and M2 is shown in FIG. 22, also using an Op Amp.

Figure 22:
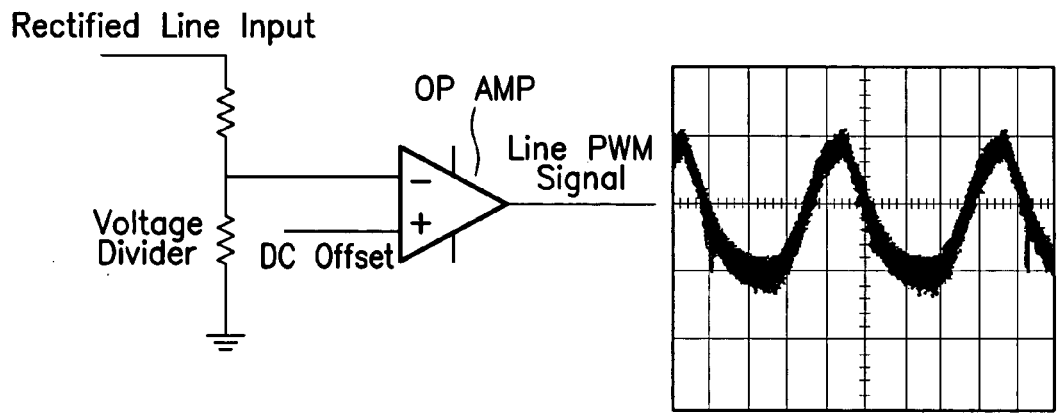
FIG. 22 shows a circuit for the PWM signal for control of the line side switches of FIG. 16.

Changing the voltage divider of FIG. 22 gives different amplitudes of the swing. Basically, the bigger the swing, the better the THD and power factor, as it forces the current lower when it should be lower. However, applying this when controlling the lamp is slightly different, as when the pulse width gets too small, the input capacitor will not be able to be completely discharged. It then feeds back to make the swing to be smaller.

Changing the DC offset to the Op Amp of FIG. 22 changes the level of the PWM signal. Raising it will lower the DC bus voltage level. When it is too high the DC bus will not be able to be charged up. However, the valley should be around 50% for the reason mentioned before so it can not be too low. Also, that makes THD and power factor worse.

Figure 23:
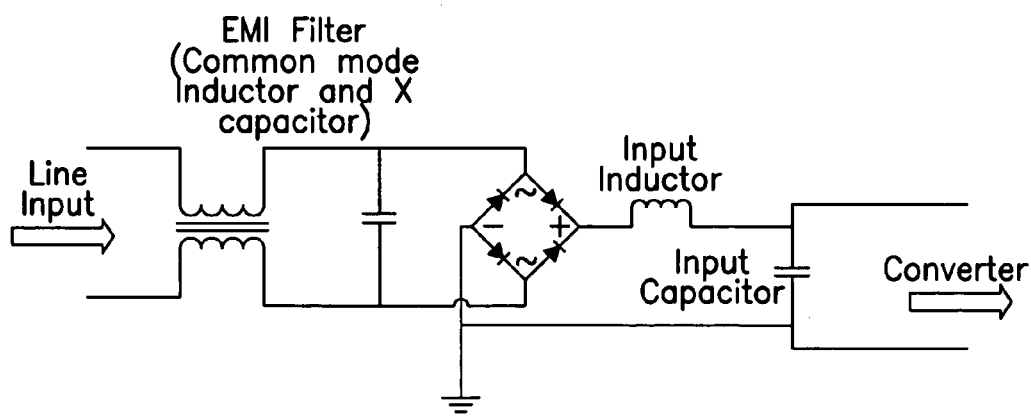
FIG. 23 shows an input circuit for the converter according to the invention.

FIG. 23 shows that the input stage of the pendulum converter is much the same as in a conventional converter. However, the input capacitor size matters when driving a lamp. For example, in one embodiment of the circuitry, using a 220 nF input capacitor gives 25.1% THD and 0.912 PF; while a 100 nF input capacitor gives 20.2% THD and 0.938 PF.

Figure 24A:
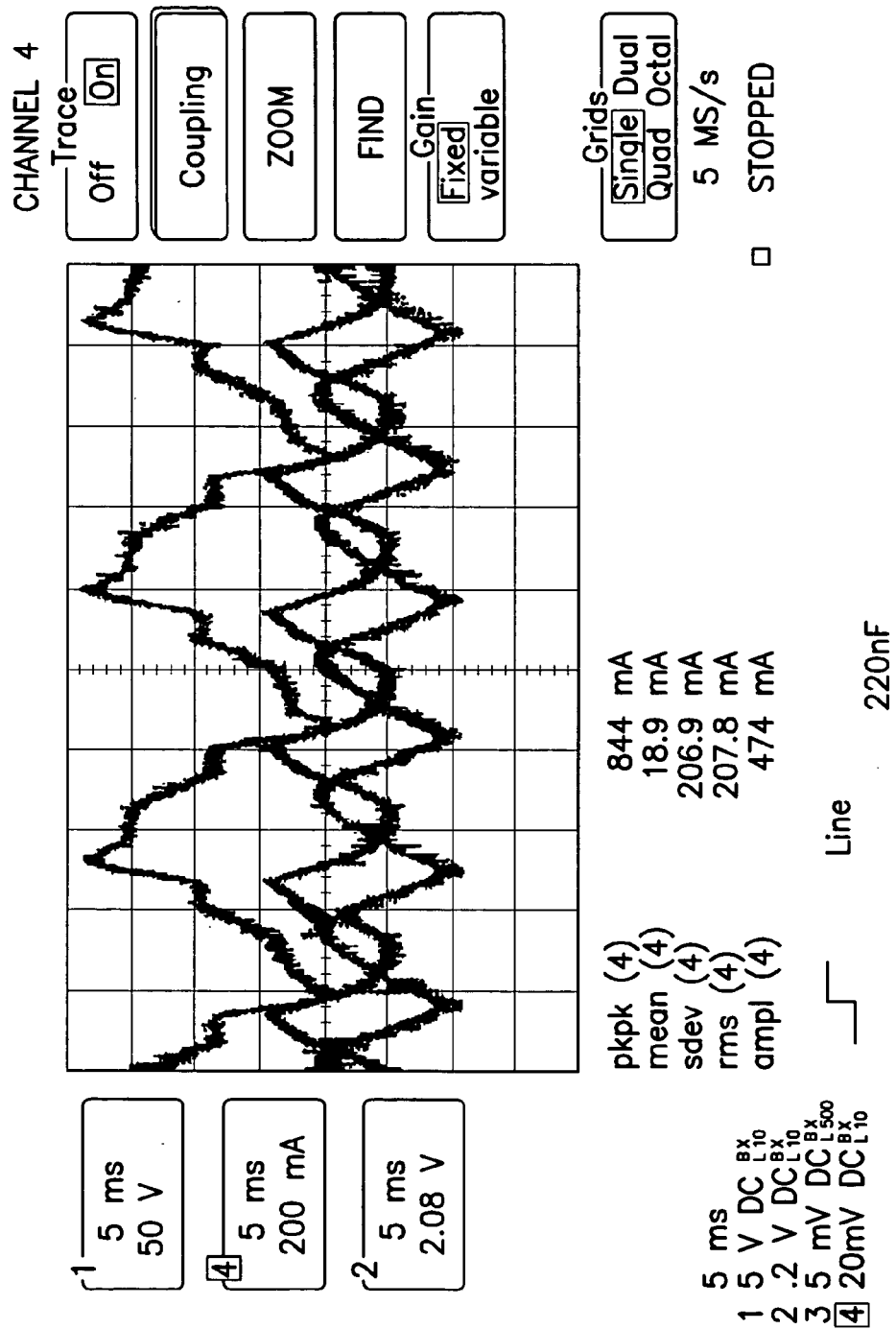
FIG. 24 presents two graphs showing how different values of the input capacitor affect the input current.
Figure 24B:
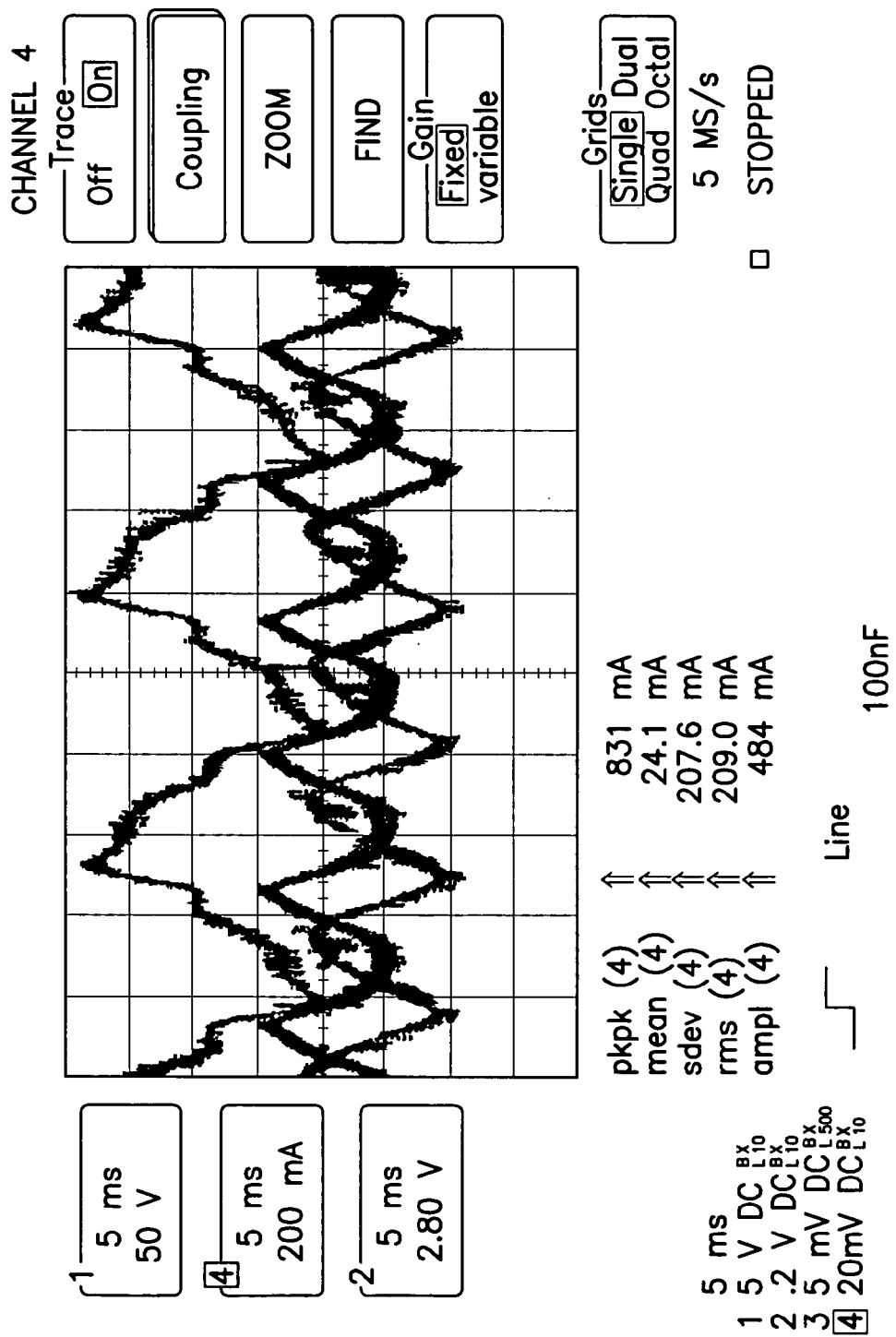

FIG. 24 shows how the input capacitor affects the input current. The left graph shows the input current with a 220 nF input capacitor in the circuit and the right graph shows the input current with a 100 nF capacitor. The top waveform shows the input current. The 100 nF input capacitor helps to make the input current less distorted.

Figure 25:
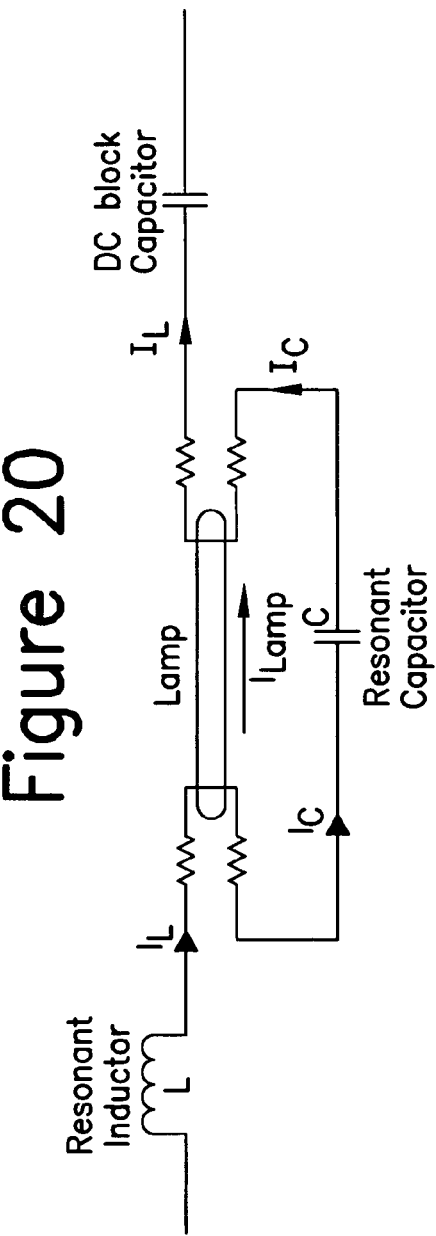
FIG. 25 shows a resonant tank circuit schematic.

Turning to FIG. 25, the resonant inductor and the resonant capacitor C determine the resonance frequency according to the equation $$f = \frac{1}{2\pi\sqrt{LC}};$$

the Q factor follows the equation $$Q = \frac{R}{\sqrt{\frac{L}{C}}}$$

while R is the load according to the resistance. The higher the Q factor, the higher the voltage applied to the load. Also, a higher circulation current will occur. As in this topology there is no high voltage supplied by a boost converter, the Q factor needs to be high enough to obtain the proper voltage across the lamp. In an exemplary embodiment, with a 22 nF resonant capacitor, 600 uH resonant inductor, and a lamp resistance of about 520 Ω, the Q factor is about 3.15, and the circulation current is about 3 times the load current. This high circulation current is one of the main drawbacks of this circuit. For this reason, the circuit is preferably used with a 220V AC input. With a 110V input, the Q factor needs to be twice as high and the circulation current will then be too high. By operating at a higher frequency, the inductor and capacitor can be reduced in size, saving cost and maintaining the Q factor at the same time.

Higher Q factor helps in obtaining better THD and power factor, on the other hand. When Q factor is lowered, the input capacitor can not be discharged all the way to zero during the cycle, and thus causes a deteriorated THD and power factor.

Once the design power rating is fixed, the lamp should be chosen to place in the circuit. The circuit according to the described embodiments will power a 40W lamp.

The DC bus capacitor value determines the ripple amplitude of the DC bus voltage. The smaller the capacitor is, the larger the ripple. Using a 6.8 uF capacitor, in the illustrated circuit, the voltage swings from about 100V to 200V. A film capacitor is preferable as it has a much longer life compared with an electrolytic capacitor. Also, lower voltage rating (250V) MOSFETs can be used for the DC bus side compared with 600V ratings of conventional converters.

According to FIG. 16, a DC shift is added to the DC bus side signal by the summer to determine the pulse width for the control of the DC bus side switches. The pulse width controls the DC bus voltage level. The smaller the pulse width of switch M3, the higher the DC bus voltage. Higher DC bus voltage gives more stable lamp current. However, when it is too high, the input capacitor will not be discharged completely when the input voltage across it is zero. The DC bus voltage then is kept a little bit higher than the theoretical value which is half of the peak value of the input voltage as shown in FIG. 15.

According to the invention, the pendulum resonant converter does not have to work on the inductive side of resonance to have soft switching as in conventional ballast designs.

Figure 26:
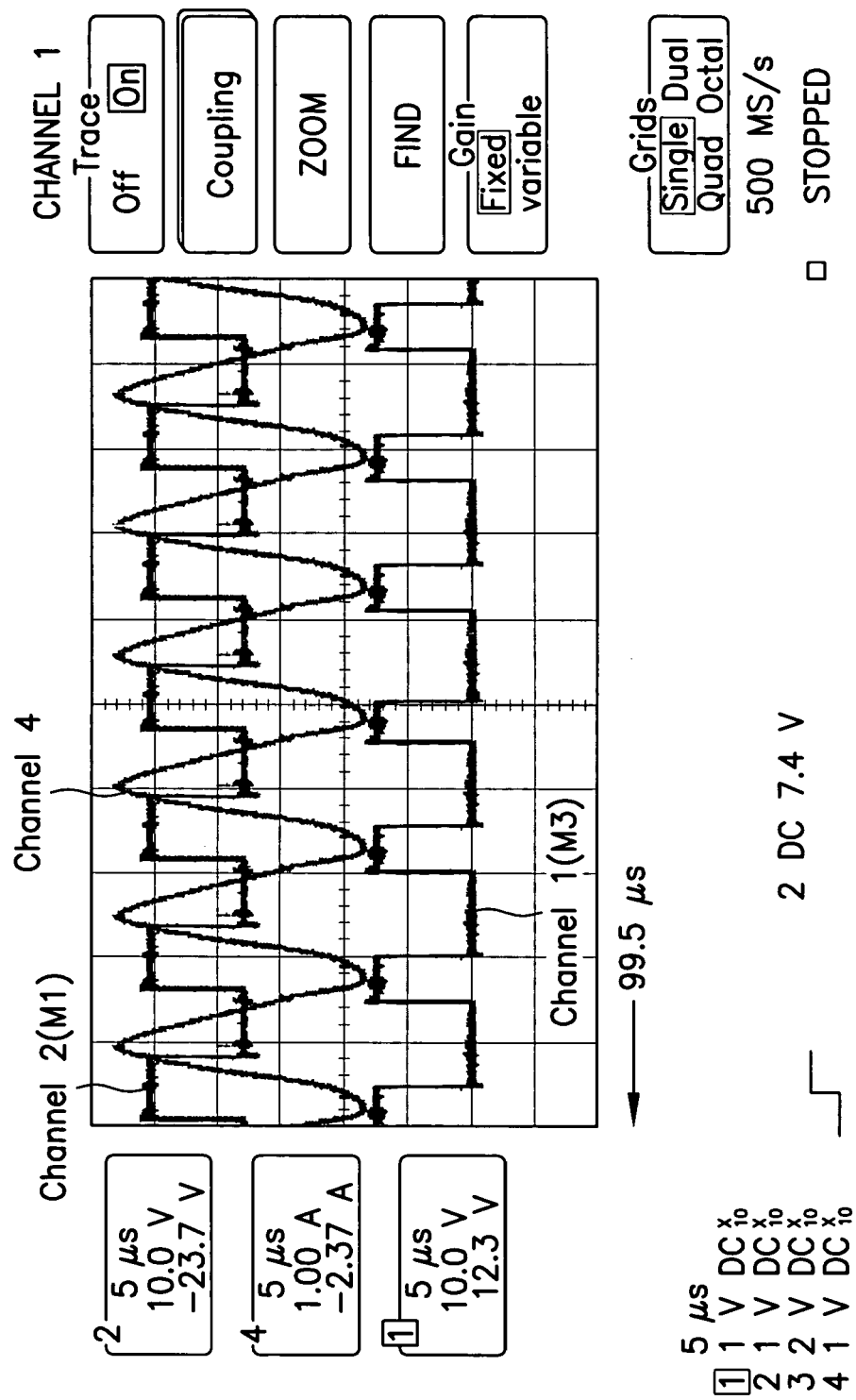
FIG. 26 shows waveforms of the circuit of FIG. 16 relating to soft switching.

Assuming the circuit operates right at the resonance frequency, the soft switching issue can be analyzed by looking at FIG. 14. As shown in the figure, the phase shift between the turning on edge of M1 and the fundamental component of the voltage of the resonant tank equals the phase shift θ between M1 and M3. When θ<0, the turning on edge of M1 is always beyond the resonant current and soft switching occurs. The switching current is shown in FIG. 26. Channel 1 shows the switch M3 control signal; channel 2 shows the switch M1 control signal; and channel 4 shows the resonant tank current. It is shown that as the M3 switching signal is leading, the current going through M1 is negative when M1 is turning on, and positive when M1 is turning off, which fulfills the requirement of soft switching of M1, and by analysis according to FIG. 5, M2 will have soft switching simultaneously.

Figure 27:
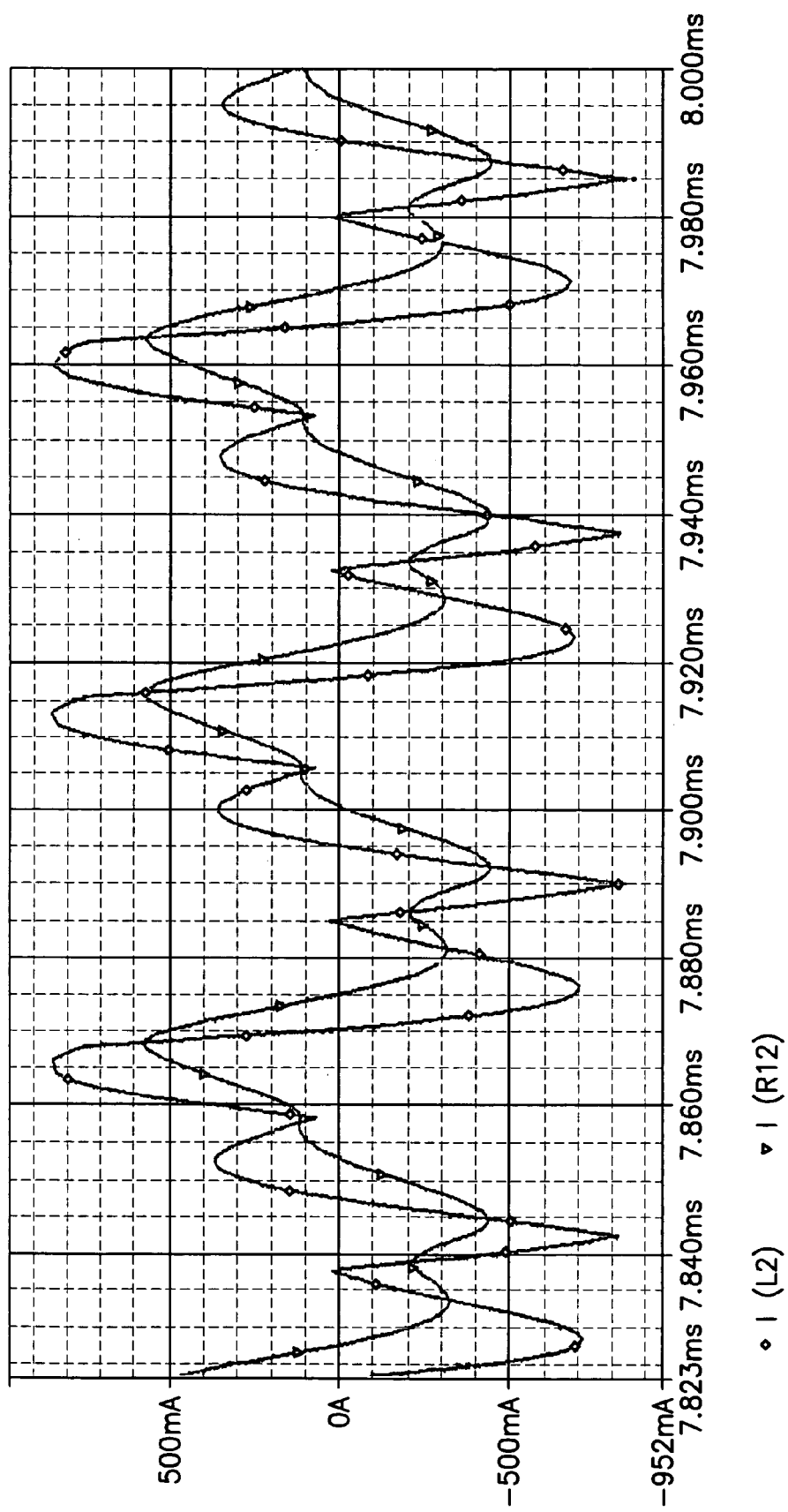
FIG. 27 is a graph of resonant tank current and load current.

This approach to soft switching is more related to the phase shift control but not the switching frequency vs. the resonance frequency as in conventional half bridge resonant converters. Even when the resonant tank is operated below resonance, soft switching can be obtained by proper phase control. This observation provides many new possibilities for the control of general-purpose pendulum converters. However, The trade off for this control method is that soft switching can not be realized for the DC bus bridge comprising switches M3 and M4. In order to have soft switching on both sides of the bridge, a capacitive operating frequency is required, which means the switches operate with a frequency under resonance. As shown in FIG. 27, operating in this manner allows a large ratio of third harmonics into the resonant tank while the load current is still satisfactory according to the filtering behavior of the parallel resonant tank.

Figure 28:
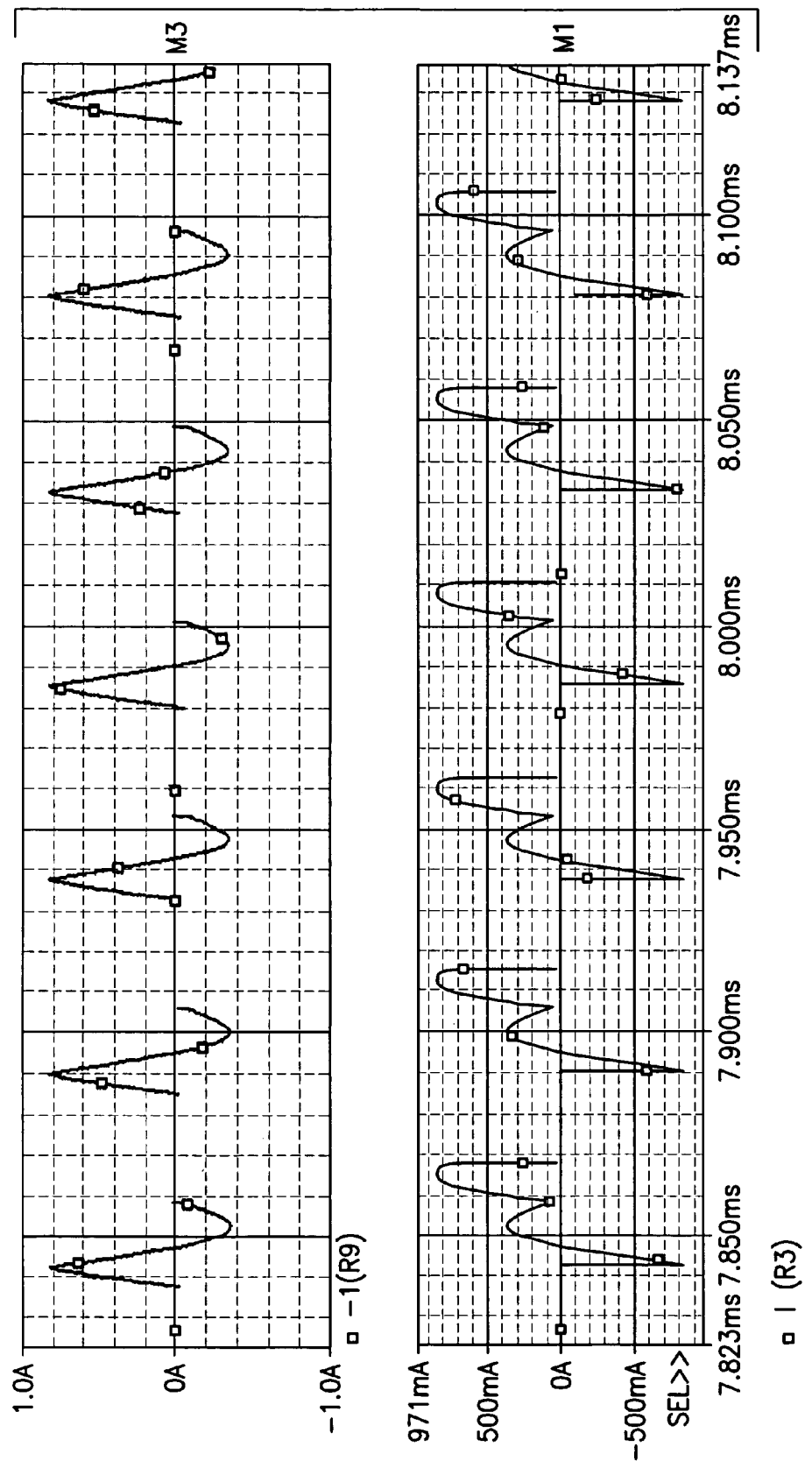
FIG. 28 shows the switching currents in switches M3 and M1.

The third harmonics help the soft switching issue as shown in FIG. 28. While the line side switch M1 still has soft switching, the DC side switch M3 now has close-to-zero switching, which is semi soft switching. By the symmetric analysis done above, M2 will have soft switching and M4 will have semi soft switching at the same time.

Figure 29:
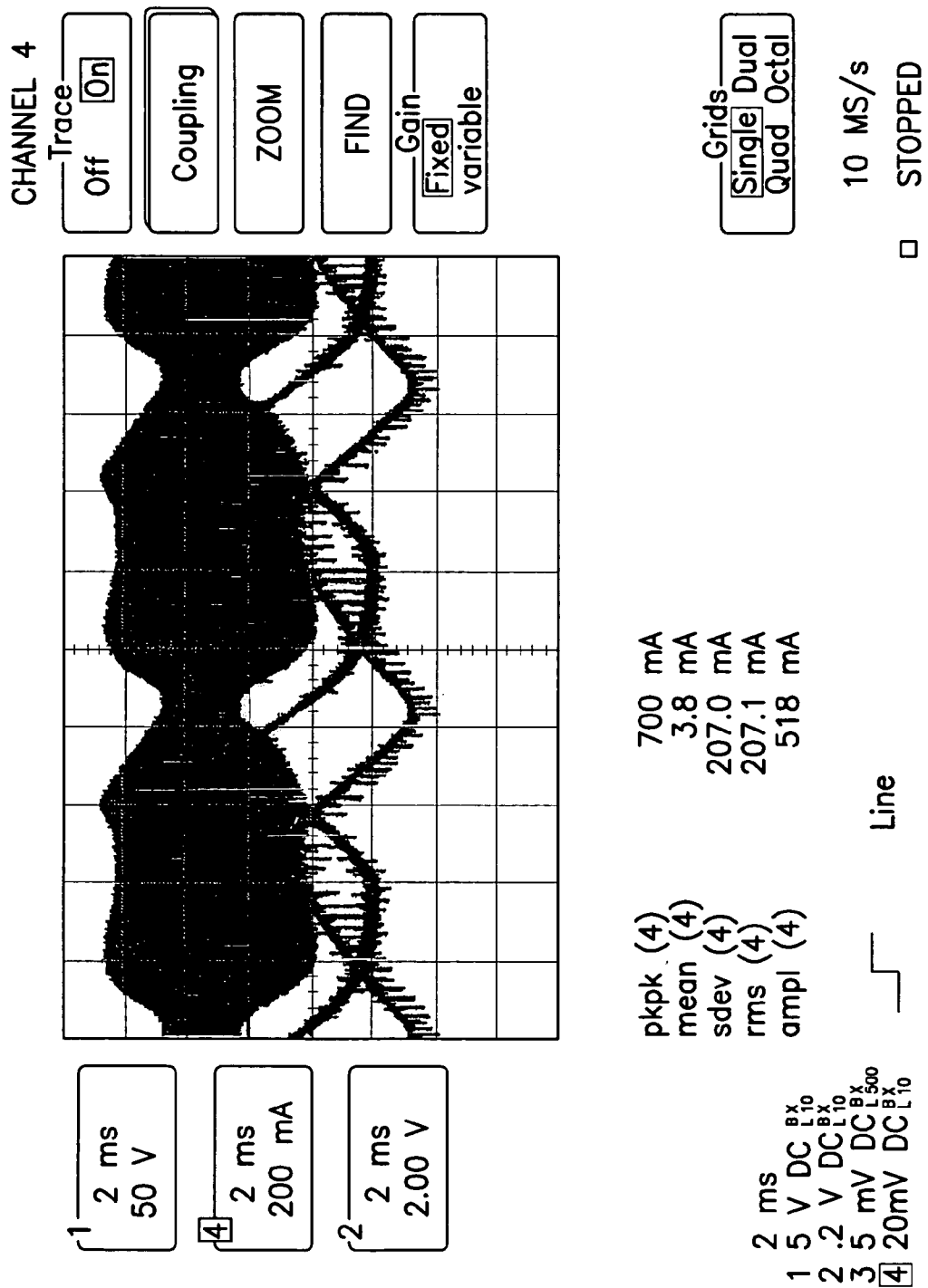
FIG. 29 shows exemplary waveforms of the circuit of FIG. 16 for one value of DC bus capacitor.

In an exemplary embodiment, a 6.8 uF capacitor was used as the DC bus capacitor. FIG. 29 shows waveforms for the circuit, including output current, line side PWM and DC bus voltage using a 6.8 uF DC bus capacitor.

Figure 30A:
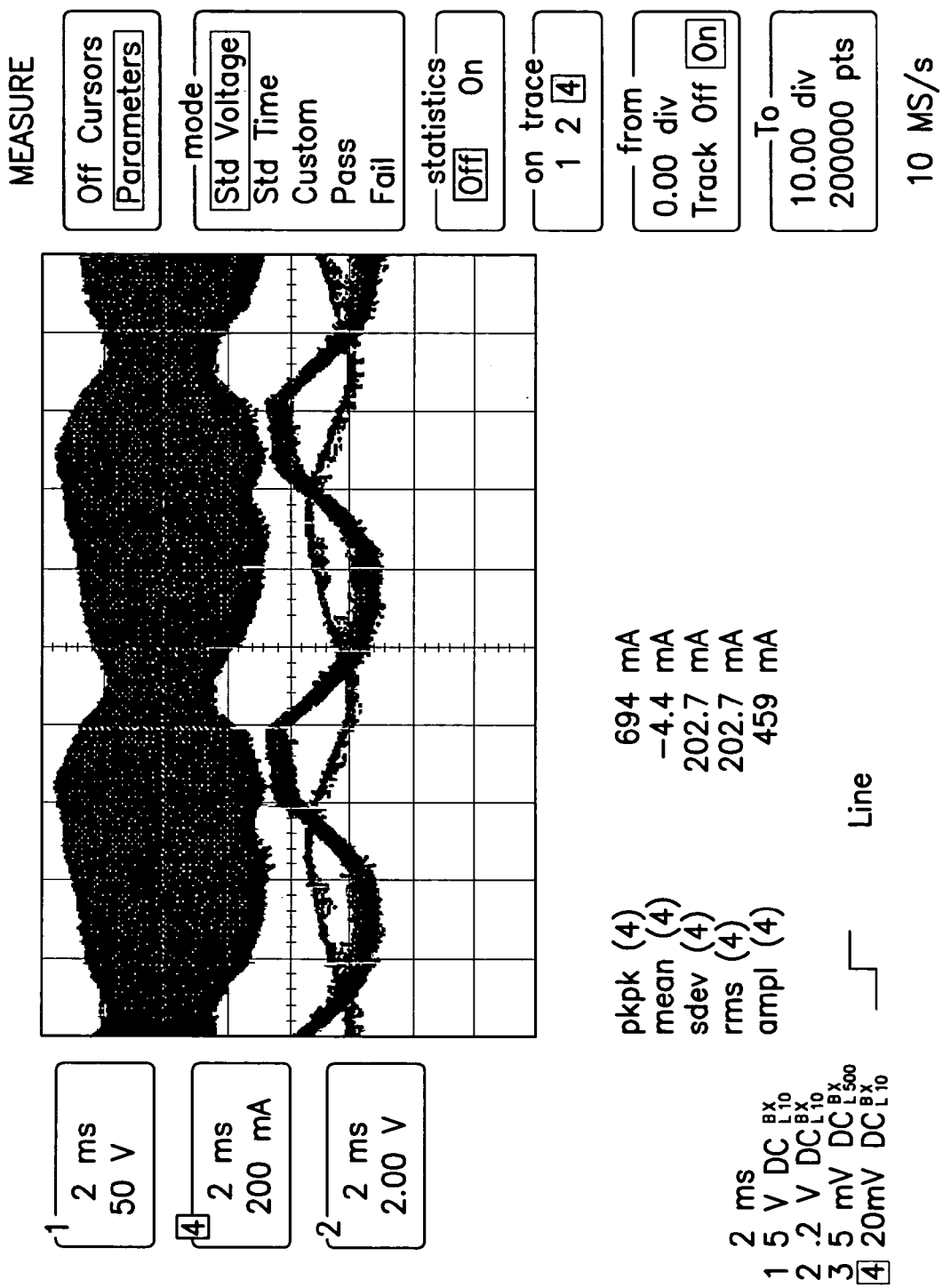
FIG. 30 shows exemplary waveforms using a larger DC bus capacitor.
Figure 30B:
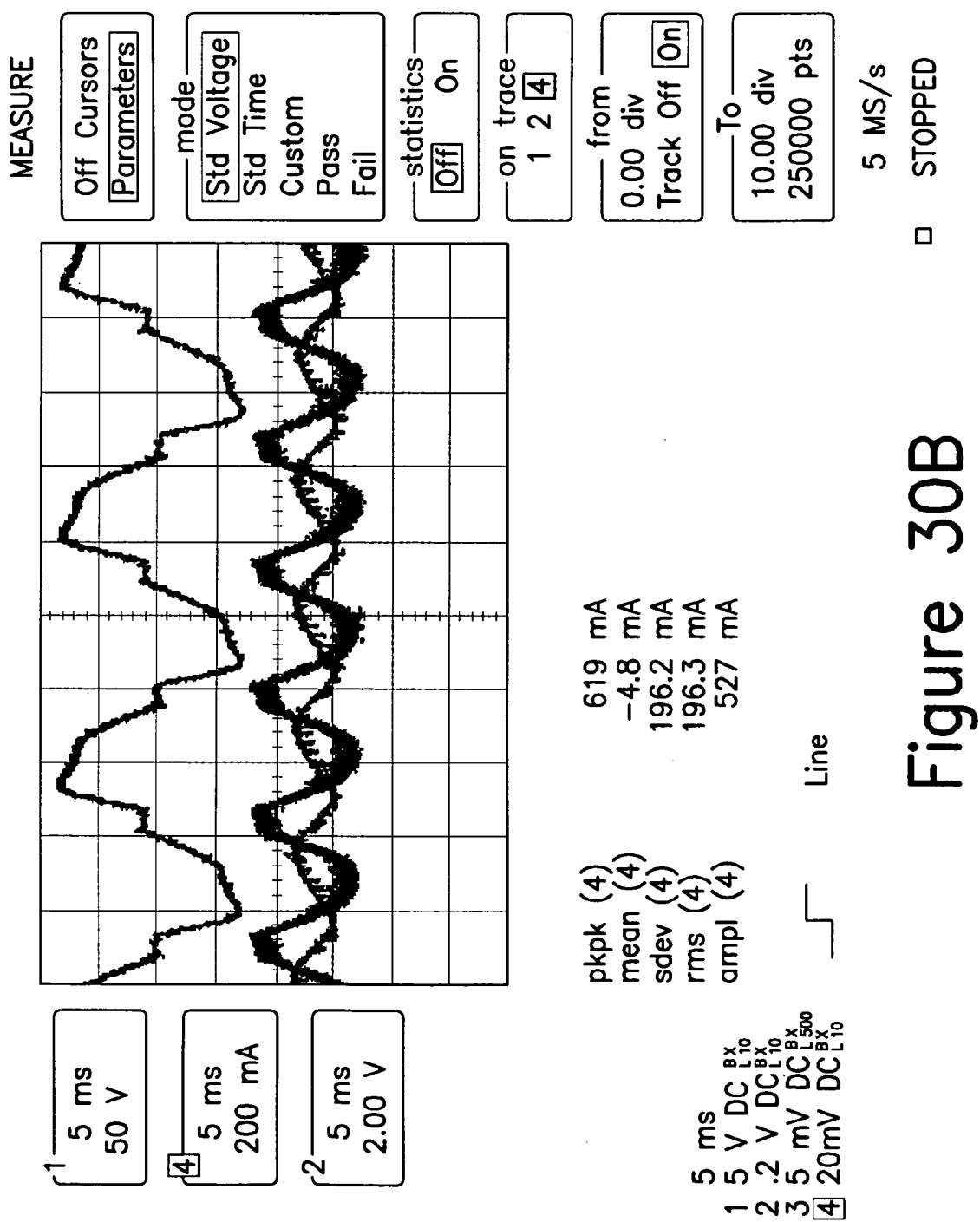

In the exemplary embodiment, the Crest Factor of the output was 1.69, while the THD was 20.2% with 0.938 PF as indicated above. As shown in FIG. 30, using a 22 uF DC bus will give much better THD and PF performance while the Crest Factor is about the same.

However, the shape of the load current and input current, though acceptable, is not optimal. Also, as discussed, there is a large circulation current. The input is preferably 220v. The THD and PF can be significantly improved when using a purely resistive load, and a transformer can be used to allow the circuit to be used at lower input voltage.

In conclusion, Table 5 compares experimental data with the prior art 2 stage solution. All the datas are based on a 100 nF input capacitor and a 6.8 uF DC bus capacitor.

TABLE 5.1

Comparisons of The Pendulum Ballast and Conventional Ballast Solution

|  | Pendulum Converter | Existing 2 Stages Solution |
| --- | --- | --- |
| No. Of Inductors | 3 | 4 |
| No. Of MOSFETs | 4 | 3 |
| MOSFET Voltage Ratings | 2 of 400 V, 2 of 250 V | All 600 V |
| CBUS Value | 6.8 uF | 22 uF |
| CBUS Voltage Rating | 250 V | 600 V |
| CBUS Type | Film capacitor | Electrolytic capacitor |
| Power Flow Control | Bi-directional | Single direction |
| In Rush Current Limit | Yes | No |
| Lamp Types | Determined by converter power rating | Determined by converter power rating |
| Efficiency | 70%-80% | 70%-80% |
| THD | 20.2% | 20% |
| PF | 0.938 | 0.99 |
| Crest Factor | 1.69 | 1.5-1.6 |
| Input Voltage Range | 220 V rating | 110/220 V rating |
| Circulation Current | About 3 times load current | About 1.5 times load current |
| Soft-switching | 1.5 hard switching switch | 1 hard switching switch |

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A resonant switching converter comprising:
   a first pair of series connected switches comprising a high side switch and a low side switch coupled across a DC input voltage, there being a first switched node between the switches;
   a second pair of series connected switches comprising a high side switch and a low side switch coupled across a DC bus, there being a second switched node between the switches;
   a DC bus capacitor coupled across the DC bus;
   the first and second switched nodes adapted to have a load coupled therebetween;
   the high side switch of said first pair of switches supplying current to the load from said DC input voltage, the low side switch of said first pair of switches being switched opposite said high side switch of said first pair of switches and providing a re-circulation path to allow bi-directional current flow through the load;
   the high side switch of said second pair of switches supplying current to the load from said DC bus capacitor, the low side switch of said second pair of switches being switched opposite said high side switch of said second pair of switches and providing a re-circulation path to allow bi-directional current flow through the load;
   a controller for controlling the switching of each of said switches of said first and second pairs of switches, said controller comprising a phase shift circuit providing a phase shift between the control signals driving the switches of the first and second pairs to shape the waveshape of the output voltage of the converter provided to the load;

the controller further comprising a first circuit for providing a first compensation signal for the control signals driving the first pair of switches to compensate for variation of the DC input voltage; and a second circuit for providing a second compensation signal for the control signals driving the second pair of switches to compensate for variation of the DC bus voltage.

2. The converter of claim 1, wherein the first circuit comprises a circuit for generating a first pulse width modulated signal to control the first pair of switches wherein the pulse width provided to control the first pair of switches varies with the DC input voltage.

3. The converter of claim 2, wherein the pulse width of the control signal provided to the high side switch of the first pair of switches is reduced when the DC input voltage or current is low and vice versa.

4. The converter of claim 2, wherein the first circuit comprises a first comparator receiving at one input a voltage related to the DC input voltage and at a second input an oscillator signal and for generating the first pulse width modulated signal.

5. The converter of claim 2, wherein the second circuit comprises a circuit for generating a second pulse width modulated signal having a pulse width varying with the voltage on said DC bus.

6. The converter of claim 5, wherein the second pulse width modulated signal has an increased pulse width when the DC bus voltage reduces and vice versa.

7. The converter of claim 6, wherein the second circuit comprises a further comparator for generating the second pulse width modulated signal, the comparator receiving at one input a voltage related to the DC bus voltage and at a second input an oscillator signal and generating an output comprising said second pulse width modulated signal.

8. The converter of claim 7, further comprising a superimposing circuit for superimposing said phase shift onto said second pulse width modulated signal and providing a superimposed pulse width modulated signal wherein said superimposed pulse width modulated signal is phase shifted to provide said phase shift and pulse width modulated to control the on times of said second pair of switches.

9. The converter of claim 5, wherein the first and second pulse width modulated signals comprise a pair of opposite phase pulse width modulated signals for driving said respective first pair of switches and second pair of switches.

10. The converter of claim 2, wherein the first circuit further comprises an amplifier stage for providing a signal related to said DC input voltage.

11. The converter of claim 1, wherein said load comprises a resonant inductor in series with a resonant capacitor and a lamp load in parallel with said resonant capacitor.

12. The converter of claim 11, further comprising a DC blocking capacitor in series with said load.

13. The converter of claim 12, wherein the lamp load comprises a gas discharge lamp.

14. The converter of claim 1, further comprising an input circuit comprising a rectifier adapted to be coupled to an AC input voltage, an input inductor in series with the rectifier and an input capacitor across which said DC input voltage is provided, and further wherein the phase shift circuit shapes the input current drawn from the AC input voltage.

15. The converter of claim 1, wherein said controller comprises a PI controller having an input related to the load current coupled to said load and for providing a signal related to said phase shift.

16. The converter of claim 15, wherein the controller further comprises an amplifier stage and a rectifier for providing a DC voltage related to said phase shift.

17. The converter of claim 1, wherein said switches comprise MOSFETs.

18. A method for operating a resonant switching converter, wherein the switching converter comprises a first pair of series connected switches comprising a high side switch and a low side switch coupled across a DC input voltage with a first switched node between the switches; a second pair of series connected switches comprising a high side switch and a low side switch coupled across the DC bus with a second switched node between the switches; and a DC bus capacitor coupled across the DC bus, a load adapted to be coupled between the first and second switched nodes adapted to have a load coupled therebetween; the method comprising:

supplying current to the load from said DC input voltage through the high side switch of said first pair of switches; switching the low side switch of said first pair of switches in opposite phase to said high side switch of said first pair of switches and providing a re-circulation path to allow bi-directional current flow through the load through said low side switch;

supplying current to the load from said DC bus capacitor through the high side switch of said second pair of switches; switching the low side switch of said second pair of switches in opposite phase to said high side switch of said second pair of switches and providing a re-circulation path to allow bi-directional current flow through the load through the low side switch of the second pair of switches;

controlling the switching of each of the switches of the first and second pairs of switches by providing a phase shift between control signals driving switches of the first and second pairs of switches to shape the waveshape of the output voltage of the converter provided to the load;

further comprising providing a first compensation signal for the control signals driving the first pair of switches to compensate for variation of the DC input voltage and providing a second compensation signal for the control signals driving the second pair of switches to compensate for variation of the DC bus voltage.

19. The method of claim 18, wherein the step of providing a first compensation signal comprises generating a first pulse width modulated signal to control the first pair of switches wherein the pulse width provided to the first pair of switches varies with the DC input voltage.

20. The method of claim 19, wherein the pulse width of the control signal provided to the high side switch of the first pair of switches is reduced when the DC input voltage or current is low and vice versa.

21. The method of claim 19, wherein the step of generating the first compensation signal comprises comparing a voltage related to the DC input voltage and an oscillator signal and generating the first pulse width modulated signal.

22. The method of claim 19, further comprising amplifying a signal related to said DC input voltage to generate said first compensation signal.

23. The method of claim 18, wherein the step of generating a second compensation signal comprises generating a second pulse width modulated signal having a pulse width varying with the voltage on said DC bus.

24. The method of claim 23, wherein the step of generating the second pulse width modulated signal comprises increasing the pulse width when the DC bus voltage reduces and vice versa.

25. The method of claim 24, wherein the step of generating the second compensation signal comprises comparing a voltage related to the DC bus voltage and an oscillator signal and generating an output comprising said second pulse width modulated signal.

26. The method of claim 25, further comprising superimposing said phase shift onto said second pulse width modulated signal to generate a superimposed pulse width modulated signal wherein said superimposed pulse width modulated signal is phase shifted to provide said phase shift and pulse width modulated to control the on times of said second pair of switches.

27. The method of claim 23, wherein the steps of generating the first and second pulse width modulated signals each comprise generating a pair of opposite phase pulse width modulated signals for driving said respective first and second pairs of switches.

28. The method of claim 18, wherein the load comprises a resonant inductor in series with the resonant capacitor and a lamp load in parallel with said resonant capacitor.

29. The method of claim 28, further comprising providing a DC blocking capacitor in series with said load.

30. The method of claim 29, wherein the lamp load comprises a gas discharge lamp.

31. The method of claim 18, further comprising supplying said DC input voltage from a rectifier providing a rectified DC voltage from said AC input voltage, and filtering said rectified DC voltage with an input inductor in series with said rectifier and providing an input capacitor across which said DC input voltage is provided, and further comprising shaping the input current drawn from said AC input voltage with said phase shift.

32. The method of claim 18, further comprising coupling a signal related to the current in said load to a PI controller and providing as an output of the PI controller a signal related to said phase shift.

33. The method of claim 32, further comprising providing an amplifier stage and a rectifier for providing a DC voltage related to said phase shift.

* * * * *